(12) United States Patent
Hannuksela

(10) Patent No.: US 8,582,663 B2
(45) Date of Patent: Nov. 12, 2013

(54) METHOD, DEVICE, AND SYSTEM FOR MULTIPLEXING OF VIDEO STREAMS

(75) Inventor: Miska Hannuksela, Ruutana (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 1833 days.

(21) Appl. No.: 11/500,802

(22) Filed: Aug. 8, 2006

(65) Prior Publication Data

US 2008/0037656 A1 Feb. 14, 2008

(51) Int. Cl.
*H04N 7/12* (2006.01)
*H04N 11/02* (2006.01)
*H04N 11/04* (2006.01)

(52) U.S. Cl.
USPC ............ 375/240.26; 375/240.12; 375/240.25; 370/314; 386/324; 386/337; 348/394.1

(58) Field of Classification Search
USPC ................ 386/337, 324; 370/314; 348/221.5, 348/211.5; 375/240.25, 240.26, 240
See application file for complete search history.

(56) References Cited

U.S. PATENT DOCUMENTS

| | | | | |
|---|---|---|---|---|
| 5,612,742 A * | 3/1997 | Krause et al. | ............ | 375/240.25 |
| 5,612,749 A * | 3/1997 | Bacher et al. | ................ | 348/552 |
| 6,005,620 A * | 12/1999 | Yang et al. | ............... | 375/240.28 |
| 6,097,435 A * | 8/2000 | Stanger et al. | ........... | 375/240.03 |
| 6,870,861 B1 * | 3/2005 | Negishi et al. | ................ | 370/537 |
| 7,076,150 B2 * | 7/2006 | Morinaga et al. | ............. | 386/279 |
| 7,486,874 B2 * | 2/2009 | Yamauchi | ...................... | 386/330 |
| 8,050,328 B2 | 11/2011 | Iguchi et al. | | |
| 2002/0136309 A1 * | 9/2002 | Imura et al. | ............. | 375/240.25 |

OTHER PUBLICATIONS

RTP: A Transport Protocol for Real-Time Applications, The Internet Society (2003), RFC 3550.*

* cited by examiner

*Primary Examiner* — Sath V Perungavoor
*Assistant Examiner* — Nathnael Aynalem
(74) *Attorney, Agent, or Firm* — Winstead PC

(57) ABSTRACT

There is disclosed a method and device of statistical interleaving of at least two digital video sequences each comprising a plurality of coded pictures to be reproduced by a decoder, wherein the two digital video sequences form a single video stream and are destined for being successively reproduced in time, comprising statistical multiplexing a first digital video sequence with a second digital video sequence, wherein the pictures of the second digital video sequence are associated with timing information, which prevents a decoder from reproducing the pictures; transmitting the digital video sequences in an interleaved manner in accordance with a result of the statistical multiplexing to the decoder; and once the second digital video sequence is to be reproduced by decoder receiving the stream: transmitting dummy pictures, which are coded to refer to one or more pictures of the second video sequence transmitted in advance to the decoder.

21 Claims, 8 Drawing Sheets

METHOD, DEVICE, AND SYSTEM FOR MULTIPLEXING OF VIDEO STREAMS

FIELD OF THE INVENTION

The present invention relates to multiplexing of video streams in a single session. Particularly, the present invention relates to multiplexing of multiple video streams of a single session in a single Real-time Transport Protocol (RTP) stream, especially applicable with MPEG 4 Part 10 (H.264/AVC) technology. More particularly, the multiplexing in accordance with the concept of the present invention allows for statistical multiplexing.

BACKGROUND OF THE INVENTION

Digital video transmissions over data communications and broadcasting networks demand high bit rates. The bit rate needed to transmit an individual video sequence with good quality depends on the image content and varies in time. As an example, sport programs typically need more data rate than cartoon when both are compressed with similar subjective quality. Scenes with high motion and full of detail require usually the highest data rates. Conventional encoding systems assign fixed data rates to each program, therefore content providers have to compromise between transmission capacity and image quality or waste data capacity. Especially in wireless transmission and broadcasting systems bit rate requirements are considered the major constraints of those systems and an economical dealing with resources is required. DVB-H (Digital Video Broadcast-Handheld) broadcasting systems can share the same radio frequency and lower layer protocol stack with DVB-T (Digital Video Broadcast-Terrestrial) broadcasting systems. Both DVB-H and DVB-T use MPEG-2 Transport Stream as the underlying transport and multiplexing protocol. Different DVB-H programs require different data rates at each moment in time. The more DVB-H programs share the same MPEG-2 Transport Stream (also known as the Multiplex), the less probable is that all programs need a very high data rate at the same time. This fact is exploited by the multi-program encoder system developed by the Fraunhofer Heinrich-Hertz-Institute (HHI). The multi-program encoder system dynamically distributes the available data rate of the MPEG-2 Transport Stream among the different programs in an optimum way. This "Statistical Multiplex" reduces the mean data rate for each program typically by about 40%.

Although, the Statistical Multiplex approach of the Fraunhofer Heinrich-Hertz-Institute (HHI) has been testified to be useful in the context of IP datacasting over DVB-H, the Statistical Multiplex as proposed by the Fraunhofer Heinrich-Hertz-Institute (HHI) is however subjected to major disadvantages. The interoperability of the multi-program encoder system required to obtain the dynamic distribution of the available overall data rate of the MPEG-2 Transport Stream among the different DVB-H programs requires a complex architecture and control implementation.

SUMMARY OF THE INVENTION

Therefore, it is an object of the present invention to overcome the aforementioned disadvantages by an improved technique enabling statistical multiplexing in a flexible way.

Objects of the present invention are solved by features of the accompanying independent claims.

According to an aspect of the present invention, a method of statistical interleaving of digital video sequences is provided. At least two digital video sequences are provided, each of which comprising a plurality of coded pictures. The two digital video sequences form one video stream and the two digital video sequences are destined for being reproduced successively in time. In particular, the video stream may be provided for transmission to a receiver entity comprising a video decoder allowing reproduction of the video stream and the picture sequences thereof, respectively. More particularly, the reproduction of the first digital video sequence and the second digital video sequence may be seamless in time. A first digital video sequence is statistically multiplexed with a second digital video sequence. Preferably, the statistical multiplexing is performed in dependence on a bit rate required for transmission of the first digital video sequence. Each of the pictures of the second digital video sequence is associated with timing information, which is indicative of the successive reproduction of the digital video sequences. The video stream is composed of the at least two digital video sequences in an interleaved manner in accordance with a result of the statistical multiplexing. Subsequently, a sequence of dummy pictures is included into the video stream. In particular, the sequence of dummy pictures may be included following the first digital video sequence. The dummy pictures are coded to refer to one or more pictures of the second video sequence, which are coded in advance in the video stream.

On side of a receiver, which is arranged to receive the statistically interleaved video stream, the video stream may be received via a transmission medium for reproduction. The video stream comprises the aforementioned at least two digital video sequences each comprising a plurality of coded pictures. The at least two digital video sequences form the one video stream and are destined for being successively reproduced in time. The video stream comprising the digital video sequences in an interleaved manner according to the statistical multiplexing is decomposed resulting in the first digital video sequence and the second digital video sequence. The pictures of the first digital video sequence are supplied to a decoder for reproduction for instance on a display. The pictures of the second digital video sequence are buffered for instance in an interleaving buffer. The buffering is performed in accordance with the ordering information indicative to the successive reproduction of the first and the second digital video sequences. The buffered pictures of the second video sequence are reproduced by the decoder, when the video stream comprises the sequence of dummy pictures, which are coded to refer to one or more pictures of the second video sequence included in advance in said video stream. In particular, the buffered pictures are reproduced once the first digital video sequence included in the video stream ends and the dummy picture sequence is included in the video stream subsequent to the first digital video sequence. More particularly, the dummy pictures are coded to instruct the decoder to refer to one or more pictures of the second sequence for reproducing displayable pictures on a display. This means that the dummy pictures do not include any picture information, but a dummy picture as suggested by the present invention includes instructions processable by the decoder, which instructions directs the decoder to apply the picture information comprised by the pictures of the second sequence included in the video stream in advance (in time) for decoding and reproducing.

According to an embodiment of the present invention, the pictures of the first video sequence and the dummy picture sequence are intended for real-time reproduction and in particular real-time transmission and reproduction; i.e. for instance to be understood in the sense of real-time streaming applications.

According to an embodiment of the present invention, the pictures of the second digital sequence are destined for later reproduction in relationship to their coding position in the video stream. In particular the pictures of the second digital sequence are included in advance in the video stream.

According to an embodiment of the present invention, one or more pictures of the digital video sequences may comprise one or more slices, which can be rearranged to pictures.

According to an embodiment of the present invention, the statistical multiplexing may be performed in dependence of an available bit rate provided by a transport medium indented for transmission purpose of the video stream and/or in dependence on a target bit rate required for transmission of the first digital video sequence. According to an embodiment of the present invention, the statistical multiplexing may be performed in dependence of a bit rate threshold.

According to an embodiment of the present invention, each picture of the second digital video sequences included in advance in the video stream may be associated with timestamp information, which refers to earlier time information than the time information of pictures of the first video sequence included in the video stream next to the pictures of the second digital video sequences.

According to an embodiment of the present invention, the dummy pictures may comprise copy information referring to one or more pictures of the second video sequence. According to an embodiment of the present invention, the dummy pictures may be inter-predicted from the one or more pictures of the second video sequence included in advance in the video stream. According to an embodiment of the present invention, the dummy pictures may be coded by omitting any prediction error data.

According to another aspect of the present invention, a computer program product is provided, which enables network-based remote control over a secure storage subsystem. The computer program product comprises program code sections for carrying out the steps of the method according to an aforementioned embodiment of the invention, when the program is run on a computer, a terminal, a network device, a mobile terminal, a mobile communication enabled terminal or an application specific integrated circuit. Alternatively, an application specific integrated circuit (ASIC) may implement one or more instructions that are adapted to realize the aforementioned steps of the method of an aforementioned embodiment of the invention, i.e. equivalent with the aforementioned computer program product.

According to an aspect of the present invention, a module for statistical interleaving of at least two digital video sequences is provided. Each digital video sequence comprises a plurality of coded pictures. The two digital video sequences form one video stream and are destined for being reproduced successively in time. A statistical multiplexer is provided, which is configured to statistically multiplex a first digital video sequence with a second digital video sequence. Each of the pictures of the second digital video sequence is associated with timing information, which is indicative of the successive reproduction of the digital video sequences. A network layer encoder is further provided, which is arranged for composing the at least two digital video sequences into the video stream in an interleaved manner in accordance with a result of the statistical multiplexing. The network layer encoder is further arranged for including a sequence of dummy pictures into the video stream. In particular, the sequence of dummy pictures may be included following the first digital video sequence. The dummy pictures are coded to refer to one or more pictures of the second video sequence are coded in advance in the video stream.

According to an aspect of the present invention, a device for statistical interleaving of digital video sequences is provided. At least two digital video sequences are provided, each of which comprises a plurality of coded pictures, which digital video sequences may be intended or prepared for being reproduced. The two digital video sequences form one video stream and are destined for being reproduced successively in time. A statistical multiplexer is further provided, which is configured to statistically multiplex a first digital video sequence with a second digital video sequence. Each of the pictures of the second digital video sequence is associated with timing information, which is indicative of the successive reproduction of the digital video sequences. A network layer encoder is adapted to compose the at least two digital video sequences into the video stream in an interleaved manner the video stream in accordance with a result of the statistical multiplexing. The network layer encoder is further configured to include a sequence of dummy pictures into the video stream. The dummy pictures are coded to refer to one or more pictures of the second video sequence coded in advance in the video stream.

According to an aspect of the present invention, a system for statistical interleaving of digital video sequences is provided. At least a video source may be provided, which supplies at least two digital video sequences. Each of the at least two digital video sequences comprises a plurality of coded pictures. The two digital video sequences form one video stream and are destined for being successively reproduced in time. A statistical multiplexer is further provided, which is configured to statistically multiplex a first digital video sequence with a second digital video sequence. Each of the pictures of the second digital video sequence is associated with timing information, which is indicative of the successive reproduction of the digital video sequences. A network layer encoder is further arranged is to compose the at least two digital video sequences into the video stream in an interleaved manner in accordance with a result of the statistical multiplexing. The network layer encoder is configured to subsequently include a sequence of dummy pictures into the video stream. The dummy pictures are coded to refer to one or more pictures of the second video sequence coded in advance in the video stream.

According to an aspect of the present invention, a video stream is provided, which is formed of at least two digital video sequences each comprising a plurality of coded pictures intended for being reproduced. The two digital video sequences form the one video stream and are destined for being successively reproduced in time. The first digital video sequence is statistical multiplexed with the second digital video sequence, wherein each of the pictures of the second digital video sequence is associated with ordering information, which is indicative of the successive reproduction of the digital video sequences. The video stream is composed of the at least two digital video sequences in an interleaved manner in accordance with a result of the statistical multiplexing and the video stream includes subsequently a sequence of dummy pictures, which are coded to refer to one or more pictures of the second video sequence coded in advance in the video stream.

Features and advantages according to the aspects of the invention will become apparent from the following detailed description, taken together with the drawings. It should be noted that same and like components throughout the drawings are indicated with the same reference number.

BRIEF DESCRIPTION OF THE DRAWINGS

Embodiments of the present invention will now be explained with reference to the accompanying drawings of which.

DETAILED DESCRIPTION OF EMBODIMENTS OF THE INVENTION

Features and advantages according to the aspects of the invention will become apparent from the following detailed description, taken together with the drawings. It should be noted that same and like components throughout the drawings are indicated with the same reference number.

Figure 1A:
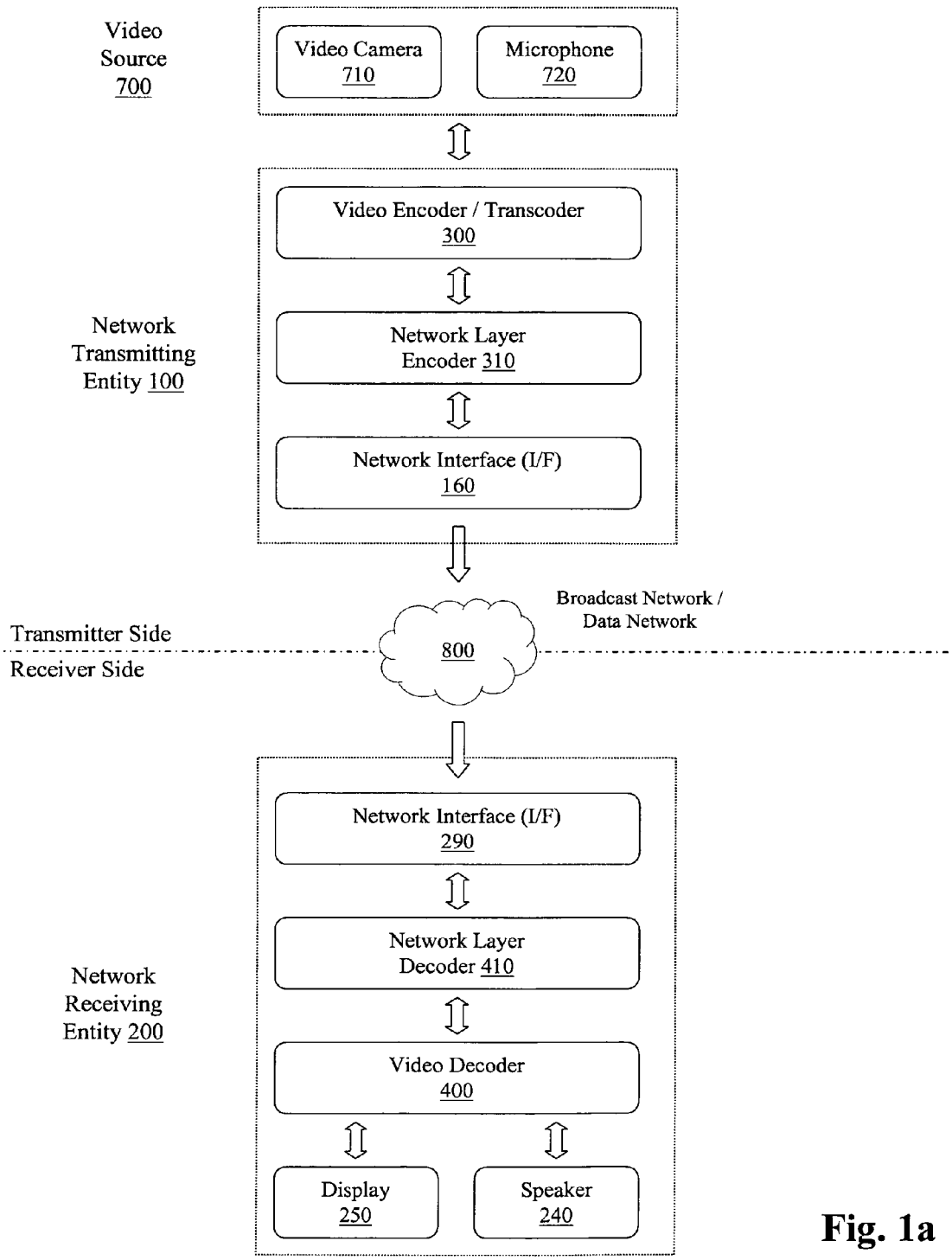
FIG. 1a shows a block diagram illustration schematically a system environment according to an embodiment of the present invention.

FIG. 1a shows an illustrative system environment for implementing the inventive concept of the present invention. In general, the system comprises a network transmitting entity 100 and a network receiving entity 200 interconnected through any data communications network 800 or data broadcast network 800. In transmitting entity 100, a encoder 300 is arranged which is supplied with a video signal originating from any video source 700 for instance originating form a video camera 710 and one or more microphones 720. The encoder 300 is configured to receive the input video signal, preferably a time-dependent video signal comprising at least a sequence of individual pictures succeeding in time, and generates a bit stream representing an encoded/compressed representation of the supplied video signal. Typically, video encoding technologies are based on lossy video compression algorithms. In the following, an exemplary video compression algorithm, namely the H.264/AVC (Advanced Video Coding) algorithm will be described for the sake of completeness. For transmission over packet-based networks including packet-switched data communication networks, packet-based broadcast networks, and streaming broadcast networks including in particular IP-based (Internet Protocol) networks such as the Internet, cellular networks, DVB-H (Digital Video Broadcast-Handheld), DVB-T (Digital Video Broadcast-Terrestrial), DVB-S (Digital Video Broadcast-Satellite), DVB-S2 (Digital Video Broadcast-Satellite, specification March 2005), DVB-C (Digital Video Broadcast-Cable) broadcasting networks, an interworking component, i.e. a payload generator 315 (cf. also FIG. 3b described below), which is herein a part of a general network layer encoder 310 for the sake of illustration, is interposed between the encoder 300 and a network interface (I/F) 160. The payload generator 315 is adapted to organized the bit stream representing the compressed representation of the originally supplied video signal into packets for transmission by the network interface (I/F) 160 through the network 800 to the network receiving entity 200 destined for reception.

On receiver side, a corresponding network interface (I/F) 290 is comprised and adapted to receive the packetized bit stream transmitted by the transmitting entity 100 through the network 800. The network interface (I/F) 290 receiving the packetized bit stream from the transmitting entity 100 supplied the packetized bit stream to an interworking layer component, i.e. a payload extractor 415 (cf. also FIG. 3b described below), which is herein a part of a network layer decoder 410 for the sake of illustration, which is configured to reconstruct the bit stream from the packetized bit stream. The reconstructed bit stream substantially corresponds to the bit stream originally generated by the encoder 300. Further, the reconstructed bit stream is in the from to be supplied to a decoder 400, which decompresses the bit stream representing the compressed representation of the video signal supplied to the encoder 300 into a video signal which substantially corresponds to the original supplied video signal on transmitter side. The video signal originating from the decoder 400 is then in the form to be supplied to a display 250 and one or more speakers 240 for reproduction.

The above illustrated system environment is briefly described for the sake of introduction. The payload generator 315 and payload extractor 415 as well as the decoder 400 will be described below in more detail. The system environment described with reference to FIG. 1a for the sake of illustration should be understood as not limiting the scope of the present invention.

Figure 1B:
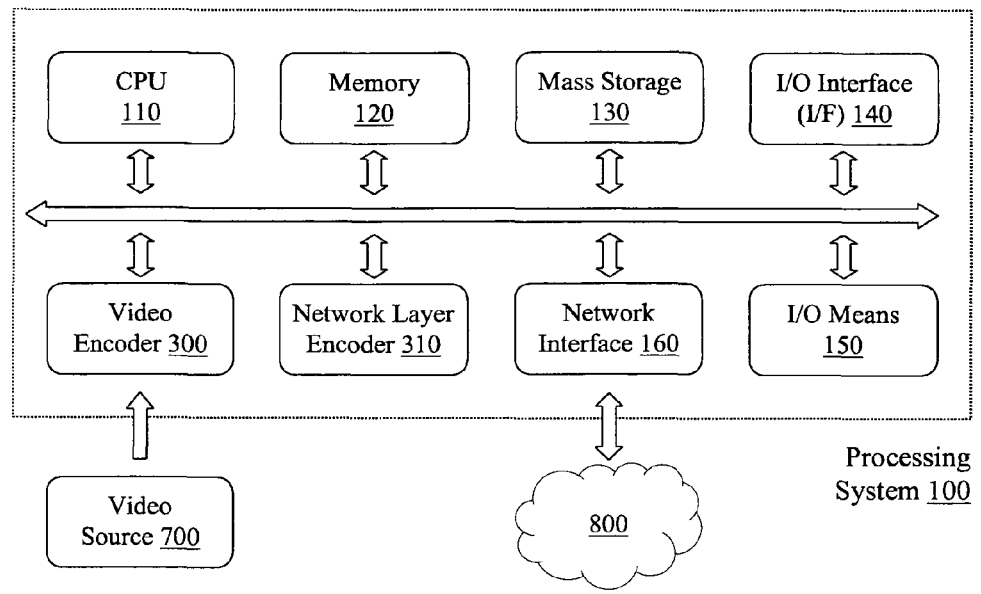
FIG. 1b shows a block diagram illustration schematically a processing device according to an embodiment of the present invention.
Figure 1C:
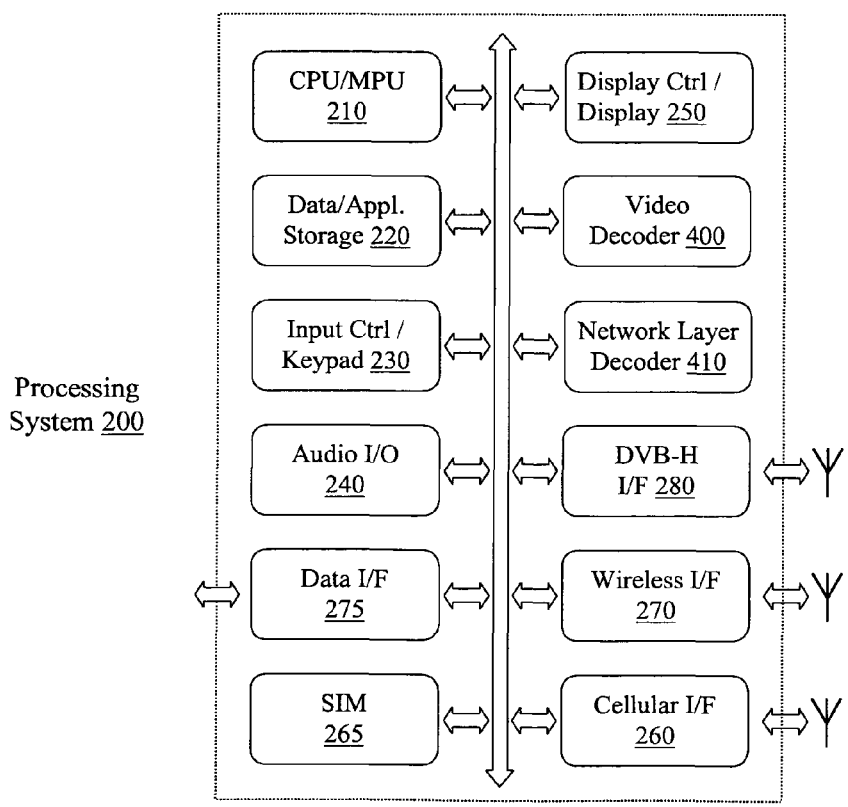
FIG. 1c shows a block diagram illustration schematically a processing device according to another embodiment of the present invention.

With reference to FIGS. 1b and 1c, structural components of exemplary network transmitting and receiving entities 100, 200 according to embodiments of the present invention are schematically illustrated.

The block diagram of FIG. 1b illustrates principle structural components of a processing system 100, which should exemplarily represent any kind of processing system or processing device employable with the present invention. The processing system 100 may represent any general purpose computer system. It should be understood that the present invention is neither limited to the illustrated processing system 100 nor to any other specific kind of processing system or device.

The illustrated processing system 100 in a generalized embodiment is based on a processing unit (CPU) 110 being connected to a memory 120. The memory 120, which comprises typically any random access memory (RAM) and/or read-only memory (ROM), is provided for storing data and/or one or more applications, which are operable with the processing system 100. The one or more applications include especially any user application software for being carried out on the processing system as well as one or more operating systems and device driver software required for operating the processing system and its further hardware components (merely partly illustrated).

Typically, the processing system 100 comprises one or more mass storages 130 and/or mass storage subsystems 130 being adapted for (random access, write once, and/or read only) storing of data in accordance with any mass storage technology including in particular hard disk drives, tape drives, floppy disk, optical media driver (such as compact disc drives and/or digital versatile disk drives), and any other currently available or future media drives. In addition, the one or more mass storages 130 and/or mass storage subsystems 130 may comprise network storage subsystems such as Network-Attached Storage (NAS), Storage Area Network (SAN), and fixed memory storages e.g. on the basis of non-volatile storage technology. The processing system 100 further comprises principle input/output (I/O) means 150 including in particular, a keyboard, a keypad, a mouse, a display, and/or audio input/output (I/O) means.

The processing system 100 may furthermore comprise one or more input/output (I/O) interfaces 140 including in particular any proprietary serial and/or parallel interface, a universal serial bus (USB) interface, a Firewire interface (according to any IEEE 1394/1394a/1394b etc. standard), any data bus interface including ATAPI (Advanced Technology Attachment Packet Interface) conform bus, a MMC (Multi-MediaCard) interface, a SD (SecureData) card interface, Flash card interface, and the like.

One or more network interfaces 160 may be comprised by the processing system 100, which enables for data communication via any data network, preferably any packet-based data communications network 800 or data broadcast network 800. The one or more network interfaces 290 should not be understood as being limited to any specific network interface technology. In particular, the network interface 160 may be implemented on the basis of wireless and/or wired interface technology. In view of wireless technology, the terminal device 100 may include one or more wireless interfaces operating in accordance with any IEEE 802.xx standard, Wi-Fi standard, WiMAX standard, any Bluetooth standard (1.0, 1.1, 1.2, 2.0+EDR, LE), ZigBee (for wireless personal area networks (WPANs)), Infra-Red Data Access (IRDA), Wireless USB (Universal Serial Bus), and/or any other currently available standards and/or any future wireless data communication standards such as UWB (Ultra-Wideband). In view of the wire-based technology, the terminal device 100 may include one or more wired interfaces operable with (Ethernet) WANs (Wide Area Networks), LANs (Local Area Networks), PSTNs (Public Switched Telephone Networks), DSLs (Digital Subscriber Lines) such as ADSLs (Asymmetric Digital Subscriber Lines) or SDSLs (Symmetric Digital Subscriber Lines), and/or other available as well as future standards.

Further, the processing system 100 comprises a video encoder 300, which is coupled to a general video source 700 for receiving a video input signal. The video source 700 may include but not limited a video camera, a camcorder, a video recorder, any video signal receiver capable for receiving radio frequency television broadcast signals such as digital TV broadcast signals (including e.g. DVB-T/S/S2/C (digital video broadcasting-terrestrial/satellite/cable) signals and/or analog TV broadcast signals (including e.g. PAL (Phase Alternation Line) coded TV RF signals, NTSC (National Television System Committee) coded TV RF signals, and/or SECAM (Système Electronique Couleur Avec Mémoire) coded TV RF signals), any imaging device including a digital camera, scanner and the like, and a storage system storing any analog and/or digital video signals for retrieval.

The video input source 700 provides video input signals to the video encoder 300 comprised by the processing system 100 for producing encoded (digital) video bit streams. The video encoder 200 may be operable with any video codec, which is today available or will be available in future. Those skilled in the art will appreciate on the basis of the following description that the inventive concept of the present invention is not limited to any specific codec. The encoding performed by the video encoder 300 may comprise a transcoding operation, where a video bit stream formed in accordance with a video codec is converted into another video bit stream formed in accordance with another video codec.

Codec is a portmanteau of "Compressor-Decompressor" or "Coder-Decoder," which describes a component on the basis of hardware and/or software implementation capable of performing transformations on a data stream or signal. In general, codec designates an algorithm or mechanism which allows putting a stream or signal into an encoded form (typically for transmission, storage, or encryption) and/or retrieving or decoding that form for viewing or manipulation in a format more appropriate for these operations. Codecs are often used in streaming media solutions.

In view of video multimedia applications, a video codec allows converting video signals (i.e. analog and/or digital video signals) e.g. from a video camera into digitally encoded signals such as bit streams for transmission over communication circuits and/or media including radio frequency communications such as different kind of networks. Moreover, the video codec allows converting digitally encoded signals back to video signals adequate for visual reproduction such as displaying.

Most codecs are lossy, in order to get a reasonably small size of the digitally encoded signals. However, there are lossless codecs as well, but for most purposes the almost imperceptible increase in quality is not worth the considerable increase in data size. Typical video codec applied today for video encoding/decoding are mentioned below for the sake of illustration.

H.261 Standard: Used primarily in older video conferencing and video telephony implementations. H.261, developed by the ITU-T, was the first practical digital video compression standard. Essentially all subsequent standard video codec designs are based on it.

MPEG-1 Part 2 Standard: Used typically for VCDs (Video Compact Disks), and also sometimes for online video transmission over the Internet.

MPEG-2 Part 2 (a common-text standard with H.262) Standard: Used on DVD (Digital Versatility Disc) and in another form for SVCD (Super Video Compact Disk) and used in most digital video broadcasting and cable distribution systems. MPEG-2 is now considered an aging codec, but has tremendous market acceptance and a very large installed base.

H.263 Standard: Used primarily for video conferencing, video telephony, and internet video. H.263 represented a significant step forward in standardized compression capability for progressive scan video.

MPEG-4 Part 2 Standard: An MPEG standard which is applicable for being used for transmission over the Internet, via broadcast technologies, and on storage media. It offers improved quality relative to MPEG-2 and the first version of H.263. Its major technical features beyond prior codec standards consisted of object-oriented coding features and a variety of other such features not necessarily intended for improvement of ordinary video coding compression capability. It also included some enhancements of compression capability, both by embracing capabilities developed in H.263 and by adding new capabilities such as quarter-pel motion compensation.

MPEG-4 Part 10 (a technically aligned standard with H.264/MPEG-4 AVC (Advanced Video Coding) and often also referred to as AVC) Standard: This new standard is the current state of the art of ITU-T (International Telecommunication Union-Telecommunication Standardization Sector) and MPEG (Moving Picture Experts Group of the International Standards Organization (ISO) and the International Electrotechnical Commission (IEC) standardized compression technology, and is rapidly gaining adoption into a wide variety of applications.

The block diagram of FIG. 1c illustrates principle structural components of a portable processing system 200, which should exemplarily represent any kind of processing system or device employable with the present invention. It should be understood that the present invention is neither limited to the illustrated portable processing system 200 nor to any other specific kind of processing system or device.

The illustrated processing system 200 is exemplarily carried out as a portable user terminal enabled for radio frequency (RF) data communications. In particular, the processing system 200 is embodied as a processor-based or microcontroller based system comprising a central processing unit (CPU) and a mobile processing unit (MPU) 210, respectively, a data and application storage 220, cellular communication means including cellular radio frequency interface (I/F) 260 with radio frequency antenna (outlined) and subscriber identification module (SIM) 265, user interface input/output means including typically audio input/output (I/O) means 240 (typically microphone and loudspeaker), keys, keypad and/or keyboard with key input controller (Ctrl) 230 and a display with display controller (Ctrl) 250, a (local) wireless data interface (I/F) 270, and a general data interface (I/F) 275. Further, the processing system 200 comprises video decoder module 400 enabled for decoding compressed digital video sequences in accordance with one or more video codecs.

The operation of the processing system 200 is controlled by the central processing unit (CPU)/mobile processing unit (MPU) 210 typically on the basis of an operating system or basic controlling application, which controls the functions, features and functionality of the processing system 200 by offering their usage to the user thereof. The display and display controller (Ctrl) 250 are typically controlled by the processing unit (CPU/MPU) 210 and provides information for the user including especially a (graphical) user interface (UI) allowing the user to make use of the functions, features and functionality of the processing system 200. The keypad and keypad controller (Ctrl) 230 are provided to enable the user inputting information. The information input via the keypad is conventionally supplied by the keypad controller (Ctrl) to the processing unit (CPU/MPU) 210, which may be instructed and/or controlled in accordance with the input information. The audio input/output (I/O) means 240 includes at least a speaker for reproducing an audio signal and a microphone for recording an audio signal. The processing unit (CPU/MPU) 210 can control conversion of audio data to audio output signals and the conversion of audio input signals into audio data, where for instance the audio data have a suitable format for transmission and storing. The audio signal conversion of digital audio to audio signals and vice versa is conventionally supported by digital-to-analog and analog-to-digital circuitry e.g. implemented on the basis of a digital signal processor (DSP, not shown).

The processing system 200 according to a specific embodiment illustrated in FIG. 1b includes the cellular interface (I/F) 260 coupled to the radio frequency antenna (outlined) and is operable with the subscriber identification module (SIM) 265. The cellular interface (I/F) 260 is arranged as a cellular transceiver enabling reception of (RF) signals from the cellular antenna, decoding the received signals, demodulating them and also reducing them to the base band frequency. The cellular interface (I/F) 260 provides for an over-the-air interface, which serves in conjunction with the subscriber identification module (SIM) 265 for cellular communications with a corresponding base station (BS) of a radio access network (RAN) of a public land mobile network (PLMN).

The output of the cellular interface (I/F) 260 thus consists of a stream of data that may require further processing by the processing unit (CPU/MPU) 210. The cellular interface (I/F) 265 arranged as a cellular transceiver is also adapted to receive data from the processing unit (CPU/MPU) 210 intended to be transmitted via the over-the-air interface to the base station (BS) of the radio access network (RAN) of the Public Land Mobile Network (PLMN). Therefore, the cellular interface (I/F) 260 encodes, modulates and up converts the data embodying signals to the radio frequency band, which is to be used for over-the-air transmissions. The antenna (outlined) of the processing system 200 then transmits the resulting radio frequency signals to the corresponding base station (BS) of the Radio Access Network (RAN) of the Public Land Mobile Network (PLMN). The cellular interface (I/F) 260 preferably supports 2nd generation digital cellular network such as PCS (Personal Communications System) or GSM (Global System for Mobile Communications), which may be enabled for GPRS (General Packet Radio Service) and/or EDGE (Enhanced Data for GSM Evolution), WCDMA (Wideband Code Division Multiple Access) such as UMTS (Universal Mobile Telecommunications System), cdma2000 (US specific CDMA system) and/or any similar, related, available and/or future standard for cellular data communications and/or telephony.

The wireless data interface (I/F) 270 is depicted exemplarily and should be understood as representing one or more wireless network interfaces, which may be provided in addition to or as an alternative of the above described cellular interface (I/F) 260 implemented in the exemplary processing system 200. A large number of wireless network communication standards are today available. For instance, the processing system 200 may include one or more wireless network interfaces operating in accordance with any IEEE 802.xx standard, Wi-Fi standard, WiMAX standard, any Bluetooth standard (1.0, 1.1, 1.2, 2.0 ER), ZigBee (for wireless personal area networks (WPANs)), infra-red Data Access (IRDA), any other currently available standards and/or any future wireless data communication standards such as UWB (Ultra-Wideband).

Moreover, the general data interface (I/F) 275 is depicted exemplarily and should be understood as representing one or more data interfaces including in particular network interfaces implemented in the exemplary processing system 200. Such a network interface may support wire-based networks such as Ethernet LAN (Local Area Network), PSTN (Public Switched Telephone Network), DSL (Digital Subscriber Line), and/or other current available and future standards. The general data interface (I/F) 182 may also represent any data interface including any proprietary serial/parallel interface, a universal serial bus (USB) interface, a Firewire interface (according to any IEEE 1394/1394a/1394b etc. standard), a memory bus interface including ATAPI (Advanced Technology Attachment Packet Interface) conform bus, a MMC (MultiMediaCard) interface, a SD (SecureData) card interface, Flash card interface and the like.

The processing system 200 may also comprise a DVB-H (Digital Video Broadcast-Handheld) receiver 280, which is adapted to receive at least multimedia content including video content via an air interface from DVB-H broadcast systems.

In general, DVB-H standard is built upon the principles of the DVB-T (Digital Video Broadcast-terrestrial) standard and includes enhancements considering requirements to be met in mobile handheld reception environment. Both DVB-H and DVB-T standards use the same physical layer and DVB-H standard can be backwards compatible with DVB-T standard. Like DVB-T standard, DVB-H standard may be provided to carry the same MPEG-2 transport stream and use the same transmitter and OFDM (Orthogonal Frequency Division Multiplexing) modulators for its radio frequency signal. Up to 50 television programs targeted for handheld devices can be transmitted in a single multiplex or the capacity of a multiplex can be shared between DVB-T and DVB-H.

However, given the requirements for each system, DVB-H provides additional support for mobile handheld reception. This includes battery saving through time-slicing and increased general robustness and improved error resilience compared to DVB-T using MPE-FEC (Multiple Protocol Encapsulation Forward Error Correction). In addition, DVB-H system broadcasts multimedia content including for instance sound, video, picture, and other data using Internet Protocol (IP). As with any portable (handheld) device, battery life is critically important. Users prefer operating for the whole day or, preferably, several days without needing to recharge their device. In order to reduce the amount of power consumed by a handheld device, DVB-H standard uses time-slicing. Time-slicing means that the data representing a particular service is delivered to the handheld device in bursts at given intervals of time.

IPDC (Internet Protocol DataCasting) is a major aspect of DVB-H systems. With IP (Internet Protocol) Datacast, content is delivered in the form of data packets using the same distribution technique as used for delivering digital content on the Internet. The use of Internet Protocol to carry its data, in so-called IP packets, allows DVB-H to rely upon standard components and protocols for content manipulation, storage, and transmission. In addition to video and audio stream broadcasting, IP Datacast over DVB-H system can be used also for file delivery.

While the DVB-T network is intended primarily for roof top antenna reception, a DVB-H network will be designed for portable reception available even inside buildings. Hence it will need a much higher signal power density. In order to reach the higher power density needed for mobile coverage levels, several network architectures can be used depending on available frequencies, allowed maximum transmitter powers and antenna heights. The following network scenarios are possible:

Existing DVB-T network with indoor coverage and DVB-H within the same multiplex, DVB-T and DVB-H using hierarchical transmission in the same radio frequency channel with DVB-H on the high-priority stream, or A DVB-H only network (which can then make use the optional 4K mode if needed).

DVB-H system may use both Single Frequency Networks (SFN) and Multiple Frequency Networks (MFN) topologies.

Figure 2A:
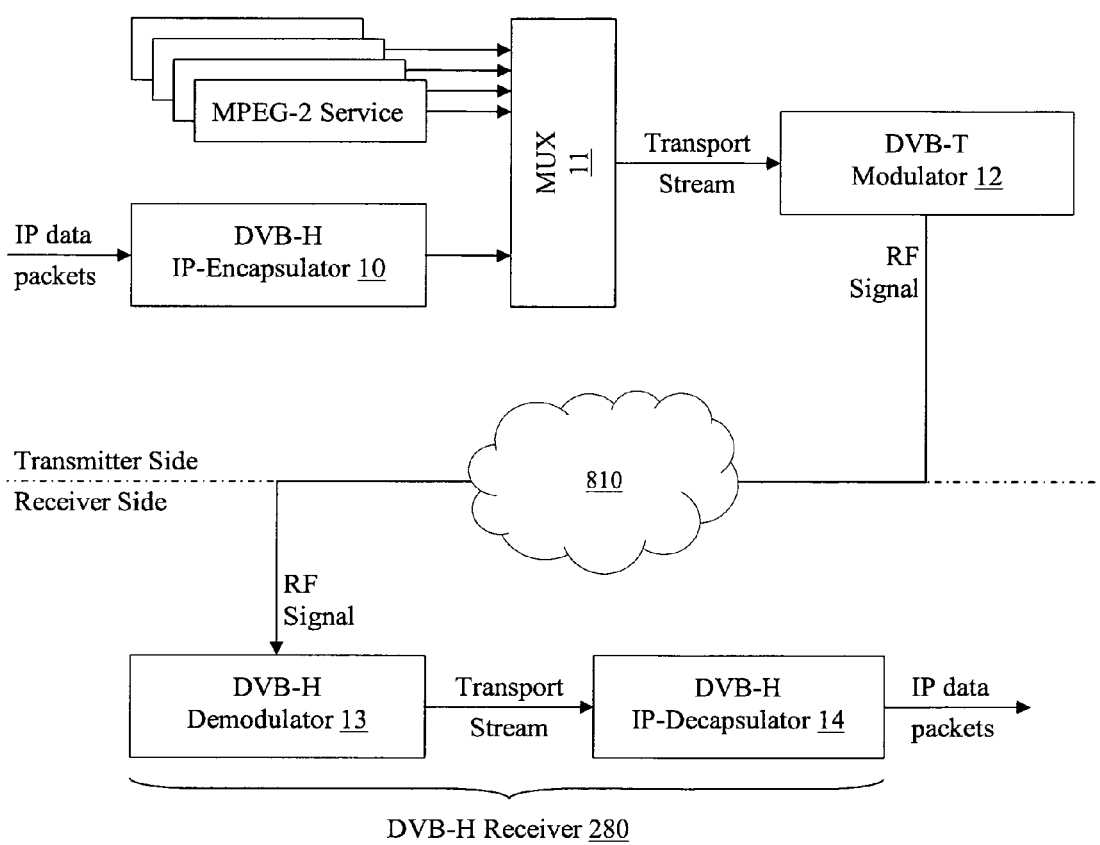
FIG. 2a shows a block diagram illustration schematically a DVB-H system environment according to an embodiment of the present invention.

It should be noted that the detailed implementation of DVB-H systems is out of the scope of the present invention. However, the skilled reader should appreciate from the aforementioned introduction that a RF signal received from a DVB-H system is processed by the DVB-H receiver such as receiver 280 to decapsulate the IP Datacast packets originally encapsulated on system side prior to transmission. Reference should be given to FIG. 2a, where a typical DVB-H system in cooperation with a DVB-T system is illustrated. In a typical DVB-H broadcasting system embedded in a DVB-T broadcasting system a multiplexor 11 multiplexes the MPEG 2 Service streams and the transport stream originating from a DVB-H IP-Encapsulator 10, which is arranged for Multiple Protocol Encapsulation (MPE) of IP-based Datacasts in a IPDC (Internet Protocol DataCasting) process. The transport stream generated by the multiplexor 11 is supplied to a DVB-T Modulator 12, which modulates the transport stream onto the radio frequency band for broadcasting via a RF channel in a point to multipoint transmission to DB-H receivers. A DVB-H receiver such as the DVB-H receiver 280 is adapted to receive the RF signal carrying the multiplexed transport stream. A DVB-H Demodulator 13 of the DVB-H receiver demodulates received RF signal to obtain the transport stream, which is supplied to a DVB-H IP-Decapsulator 14 of the DVB-H receiver. The DVB-H IP-Decapsulator 14 finally decapsulates the IP data packets originally supplied to the DVB-H IP-Encapsulator 10.

The video decoder 400 is adapted to receive a digitally encoded/compressed video bit stream. The bit stream supplied to the video decoder 400 may originate from a data storage connected to the processing system 200 or may be obtained via the cellular interface 260, the wireless interface (I/F) 270, the DVB-H receiver 280, or any other data interface of the processing system 200. In particular with reference to the latter case, the digitally encoded/compressed video bit stream is originally received in packetized form; i.e. the digitally encoded/compressed video bit stream is divided into a plurality of video data packets formed on transmitter side to allow transmission over packet-based networks such as a cellular network, wireless data communications networks and/or Digital Video Broadcast (DVB) networks. The network layer decoder 410 of the processing system 200, which component is structurally interposed between video data packets receiving interface or receiver and decoder 400, respectively, is configured to form a bit stream from the plurality of video data packets. The video decoder 400 is operable with any video codecs. The digitally encoded/compressed video bit stream is decoded by the video decoder 400 and preferably outputted to be displayed via the display controller and display 250 to a user of the processing system 200.

The components and modules illustrated in FIG. 1c may be integrated in the processing system 200 as separate, individual modules, or in any combination thereof. Preferably, one or more components and modules of the processing system 200 may be integrated with the processing unit (CPU/MPU) forming a system on a chip (SoC). Such system on a chip (SoC) integrates preferably all components of a computer system into a single chip. A SoC may contain digital, analog, mixed-signal, and also often radio-frequency functions. A typical application is in the area of embedded systems and portable systems, which are constricted especially to size and power consumption constraints. Such a typical SoC consists of a number of integrated circuits that perform different tasks. These may include one or more components comprising microprocessor (CPU/MPU), memory (RAM: random access memory, ROM: read-only memory), one or more UARTs (universal asynchronous receiver-transmitter), one or more serial/parallel/network ports, DMA (direct memory access) controller chips, GPU (graphic processing unit), DSP (digital signal processor) etc. The recent improvements in semiconductor technology have allowed VLSI (Very-Large-Scale Integration) integrated circuits to grow in complexity, making it possible to integrate all components of a system in a single chip.

Typical alternative portable processing systems or devices may include personal digital assistants (PDAs), hand-held computers, notebooks, so-called smart phones (cellular phone with improved computational and storage capacity allowing for carrying out one or more sophisticated and complex applications), which devices are equipped with one or more network interfaces enabling typically data communications over packet-switched data networks. Moreover, it should be understood that although the aforementioned processing system 200 embodied as a portable terminal device the present invention is not limited to any specific implementation of a processing terminal device. Rather, any processing terminal device capable for decoding video may be employed with the concept of the present invention. The implementation of such typical micro-processor based devices capable for processing multimedia content including decoding multimedia content is well known in the art.

Those skilled in the art will appreciate that the present invention is not limited to any specific portable processing-enabled device, which represents merely one possible processing-enabled device, which is capable for carrying out the inventive concept of the present invention. It should be understood that the inventive concept relates to addresses transmission and/or packetizing aspects of video data encoded by the video encoder 300 and intended for being decoded by the video decoder 400. The processing systems 100 and 200 comprising the video encoder 300 and the video decoder 400 are illustrated exemplarily. Any kind of processing-enabled device may be operable with the concept of the present invention including for instance a fixed and/or portable device as described above, a personal computer (PC), a consumer electronic (CE) device, a network processing entity such as a server and the like.

Figure 2B:
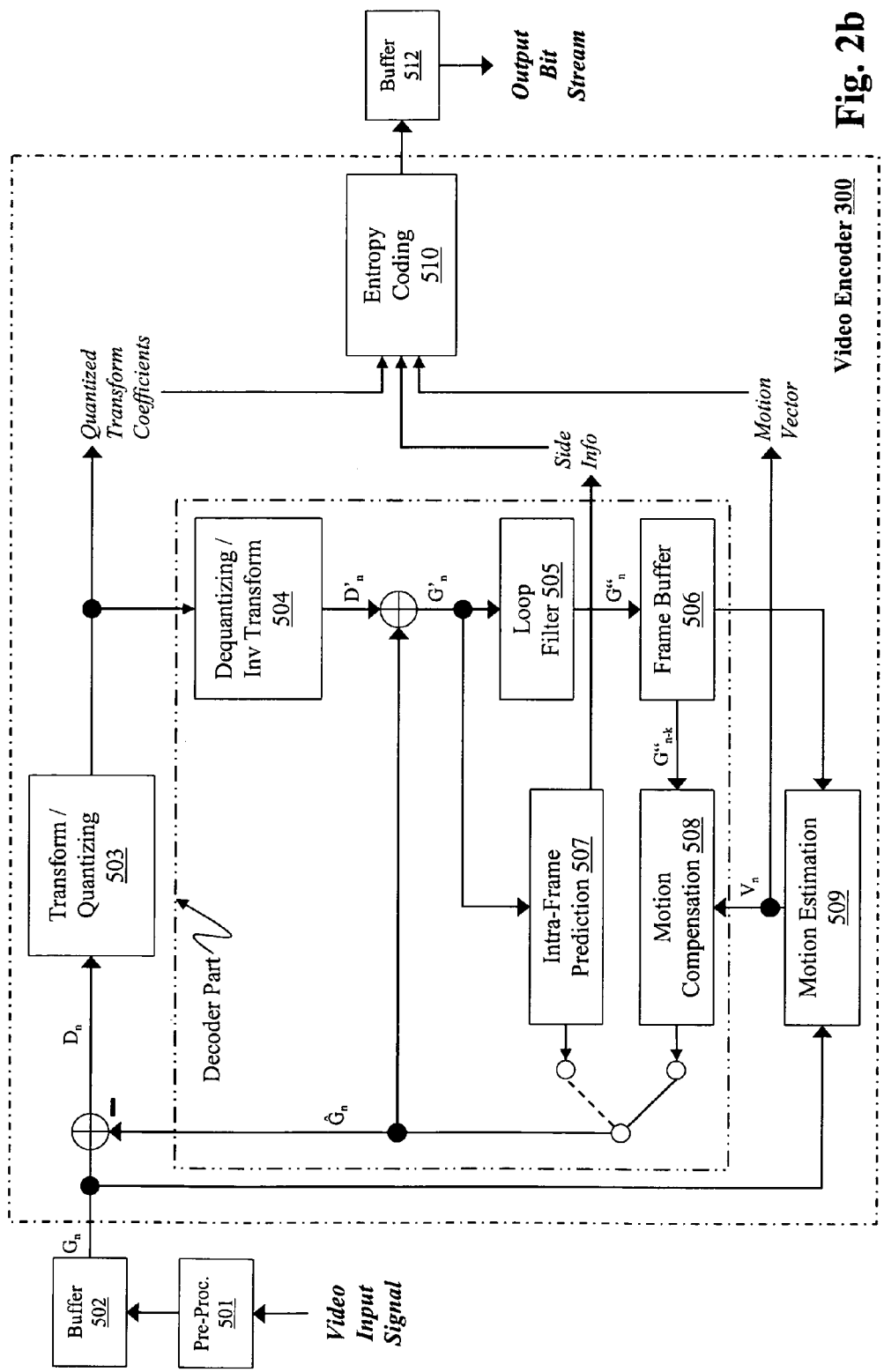
FIG. 2b shows a block diagram illustration schematically a video encoder according to an embodiment of the present invention.

FIG. 2b illustrates schematically a basic block diagram of a video encoder according to an embodiment of the present invention. The illustrative video encoder shown in FIG. 2b depicts a hybrid decoder employing temporal and spatial prediction for video encoding such as being used for video encoding in accordance with the H.264 standard. It should be noted that the present invention is mot limited to any specific video encoding standard or codec. Those skilled in the art will appreciate that the concept according to an embodiment of the present invention is applicable with any other video encoding standard including but not limited any MPEG x and any H.26x standard. The designation MPEG x should be understood as comprising in particular MPEG 1, MPEG 2, MPEG 4, and any specific profiles and levels thereof as well as any future developments. The designation H.26x should be understood as comprising in particular H.261, H.262, H.263, and H.264 as well as any related and/or future developments.

The general idea of predictive coding comprises in general two major aspects. Referring to the first aspect, a representation of the source signal is desired that allows for removal of redundant information to achieve high compression efficiency. Referring to the second aspect, irrelevant information should be removed, i.e. the portions of the signal that can be discarded without (serious) degradation of the signal content and quality.

A first frame, an Instantaneous Decoding Refresh (IDR) frame, or a random access point of a video sequence is generally coded without use of any information other than that contained in the this frame. This type of coding is designated "Intra" coding and such an Intra coded frame is typically designated as I-frame and IDR-frame, respectively. The remaining pictures of the videos sequence and the pictures between random access points of the videos sequence are typically coded using "Inter" coding, respectively. Inter coding employs information from at least one or more previously decoded pictures and is conventionally designated Inter prediction typically based on motion estimation. The encoding process for Inter prediction or motion estimation is based on choosing motion data, comprising the reference picture, and a spatial displacement that is applied to all samples of the block. The motion data which is transmitted as side information is used by the encoder and decoder to simultaneously provide the "Inter" prediction signal. The video encoder 300 preferably creates a series of (e.g. periodic) reference image frames (i.e. "Intra" or I-frames) intermingled with intervening predicted image frames (i.e. "Inter" frames including at least P-frames and/or B-frames) to maximize image coding efficiency while maintaining high image quality when reproduced by a video decoder such as the video decoder 400.

In the following, the concept of the hybrid coding scheme is presented. The scheme is called hybrid because it combines temporal prediction with transform coding of the prediction error. Here, the description focuses on the encoding of luma component on the encoder side. For chroma encoding the same scheme is employed, with motion vectors inherited from the luma component. A block diagram of the hybrid coding scheme is depicted in FIG. 2b. The discussed scheme is valid for encoding of so-called I-frames and P-frames, that allow for inter prediction from a single reference and intra coding. The scheme can be extended for so-called B-frames that allow for the combination of predictors from two reference frames. The name B-frame results from the fact that these frames are traditionally inserted between the frames of a P-frame sequence, and thereby can employ bi-directional prediction from the adjacent P-frames.

Depending on the motion prediction and the transform coding method, the scheme can be applied to whole pictures or partitions of pictures. The standardized hybrid coding schemes employ so-called macroblocks of 16×16 luma pixels (plus chroma) as the working unit for the prediction scheme and 8×8 or 4×4 block transforms. FIG. 2b depicts the case of spatial intra prediction as it is used in H.264/AVC. The boundary pixels of decoded neighboring macroblocks can be used for intra prediction. MPEG-1 and MPEG-2 employ DC prediction from neighboring blocks; H.263 and MPEG-4 allow for DC and AC prediction. These prediction methods are employed in the transform domain.

Taking a current frame received from the buffer 502, the video encoder 300 chooses the best block in a frame provided either by the Intra-frame prediction unit 507 or the motion compensation unit 508 to calculate a difference frame, which is processed with a transform and quantization operation performed by the means of a transformer and quantizer. Herein, but not limited thereto, these units are schematically illustrated as an integrated transform and quantizing unit 503. Then, the resulting quantized transform coefficients are entropy coded by the means of the entropy coding unit 510 such that a compressed video bit stream results, which may be stored temporarily in a buffer 512 for being finally outputted. In other words, a residual of the prediction (one of "Inter" or "Intra"), which is the difference between the original and the predicted block, is transformed, scaled, quantized and entropy coded. The now fully encoded video bit stream may be transferred to memory and then recorded on the desired media or transmitted to one or more desired receiver.

In more detail, a current block $G_n$ to be encoded is predicted by a prediction block $\hat{G}_n$ that can either be generated from intra or inter prediction. Intra prediction can reuse decoded areas of the same picture to approximate $G_n$. Inter prediction employs blocks from previously decoded frames. The prediction error signal $D_n$ is passed to the transform and the proximate quantization stage for irrelevance removal, herein the transform and quantizing unit 503. The quantized transform coefficients are entropy coded by the entropy coding unit 510 and provided to be transmitted to the decoder. In an additional Copy mode, the decoder can be advised to keep the content of the previous frame for the respective region and omit motion vector and prediction error transmission.

For re-application in the prediction process, $D_n$ is passed to dequantization and inverse transform stage, herein, but not limited thereto, dequantizing and inverse transform unit 504. The reconstructed prediction error $D'_n$ is then added to the prediction signal $\hat{G}_n$ to constitute the reconstructed signal $G'_n$.

A loop filter 505 may be applied to reduce artifacts that are due to prediction and reconstruction. Thereby, the subjective and objective reconstruction quality can be enhanced. Since reconstruction and optional loop filtering is identical to the encoder and the decoder side, both, encoder and decoder stay synchronized with the same reconstructed output $G'_n$. The reconstructed picture $G''_n$ may be stored in a frame buffer 506 to be used as reference for motion prediction. At least one picture needs to be available from the buffer 506 for subsequent motion compensation. In principal, the maximum number of pictures in the buffer 506 is only bound by implementation complexity constraints.

The motion compensation stage, herein the motion compensation unit 508, employs parameters that are estimated by the motion estimation stage, herein a motion estimation unit 509, to generate a prediction of the current block $G_n$ out of a reference $G''_{n-k}$. In case of translatoric motion compensation, the parameter set $V_n$ resulting from motion estimation is called the displacement or motion vector field. $V_n$ is entropy coded by the entropy coding unit 510 and passed to the bit stream for transmission to the decoder.

The decision which region of a frame should be predicted by which means and what degree of quantization shall be applied is drawn by a coder control that has access to all other building blocks of the scheme. This tool may apply algorithms for optimized mode decision to maximize the overall rate/distortion performance, or rate control techniques to enable an encoded stream output of constant bit rate. The hybrid encoder and decoder stay synchronized since the decoding process is integrated into the encoder. Of course, synchronization is provided only under the assumption of an error-free transmission of the bit stream. In FIG. 2b the decoder building blocks that are integrated into the encoder are surrounded by a dashed line.

The entropy coding process represents a compressing process, which assigns shorter code words to symbols with higher probabilities of occurrence and longer code words to symbols with lower probabilities of occurrence. Different entropy encoding mechanisms are applicable with video encoding. For instance with reference to H.264 video encoding standard, Context Adaptive Variable Length Coding (CAVLC) is used and, for instance with reference to Main profile broadcast content, an even more efficient Context Adaptive Binary Arithmetic Coding (CABAC) is used. In principle entropy encoding techniques take advantage of the frequency of occurrence and magnitude of non-zero coefficients in neighboring blocks to choose the variable length coding (VLC) lookup table to be used for each block.

The transform and inverse transform operation is generally based on bijective transform algorithms, including in particular exact or separable integer transform operable with H.264 video encoding standard for 4×4 sample/pixel sub-blocks and Discrete Cosine Transform (DCT) operable with MPEG x video encoding standard for 8×8 sample/pixel sub-blocks, respectively. The exact or separable integer transform enables exact inverse transform due to integer calculation. The Discrete Cosine Transform (DCT) requires rounding, which implies rounding errors, which is especially considerable with respect to inverse Discrete Cosine Transform (DCT).

The video input signal to be encoded by the vide encoder 300 outputting a resulting video output bit stream may pre-processed by the means of a pre-processing unit 501 before being supplied to the video encoder. Typically, the video input signal is picture-wise provided to the video encoder input, where a picture of a video sequence can be a frame or a field. As aforementioned, each picture is split into macroblocks each having a predefined fixed size. Each macroblock covers a rectangular area of the picture. Preferably, typical macroblocks have an area of 16×16 samples/pixels of the luminance component and 8×8 samples/pixels of each of the two chrominance components.

Typical video coding techniques use YCbCr color space for presentation, where Y is the luminance component, Cb is the blue color difference component or first chrominance component, and Cr is the red color difference component or second chrominance component. Research into the Human Visual System (HVS) has shown that the human eye is most sensitive to changes in luminance, and less sensitive to variations in chrominance. Hence, the use of YCbCr color space represents a favorable way for considering chrematistics of the human eye. If required, the pre-processing unit 501 allows transforming the video input signal from RGB (red, green, blue component) color space into YCbCr color space.

An output buffer 512 may be provided to (temporarily) buffer the output bit stream.

Figure 2C:
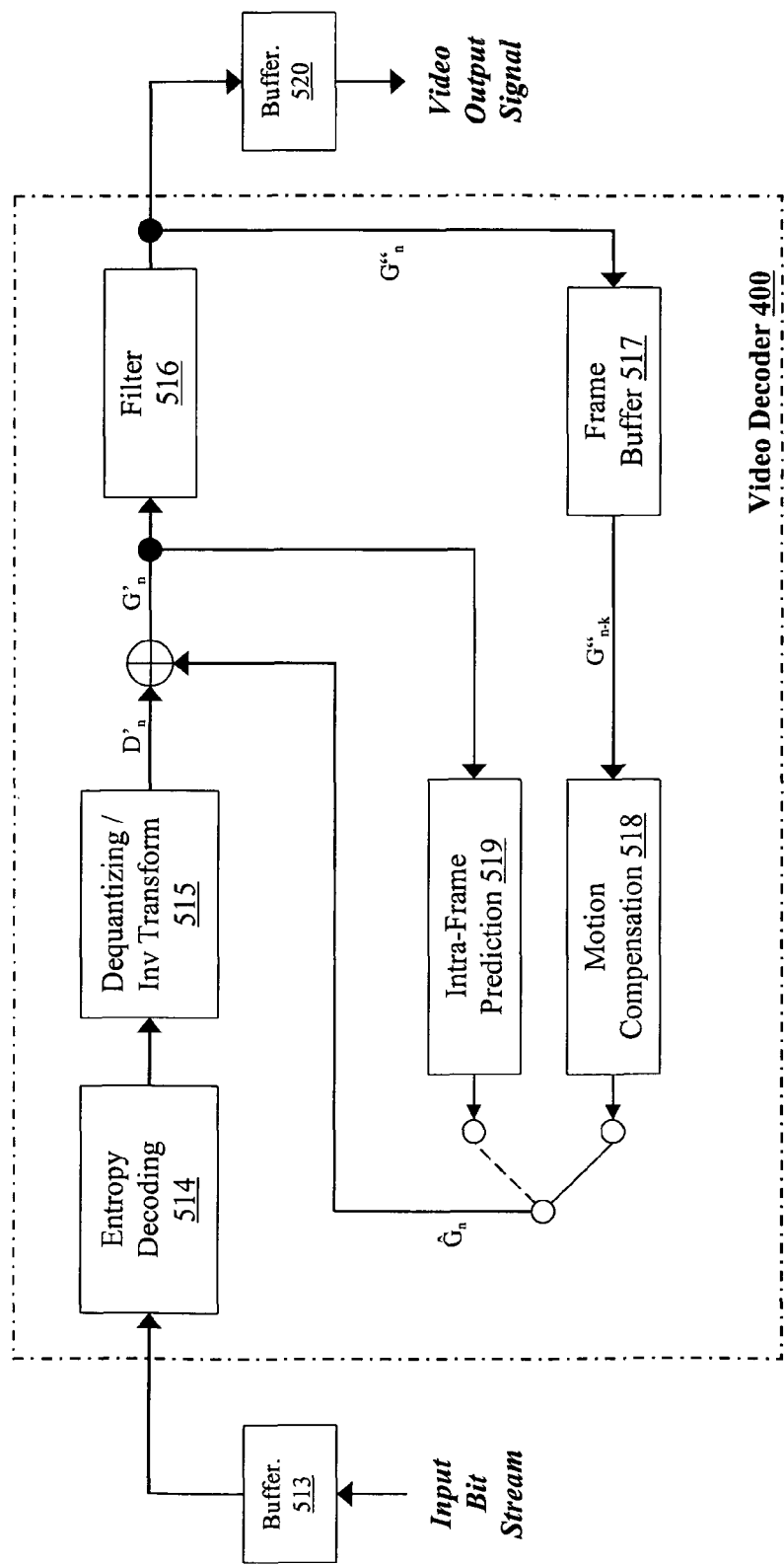
FIG. 2c shows a block diagram illustration schematically a video decoder according to an embodiment of the present invention.

FIG. 2c illustrates schematically a basic block diagram of a video decoder interoperable with the video encoder depicted in FIG. 2b according to an embodiment of the present invention. The decoder 400 receives a compressed bit stream for instance from the video encoder described above. The received compressed bit stream may be buffered in an input buffer 513. The data of the bit stream is entropy decoded by an entropy decoding unit 514 to produce a set of quantized coefficients. These coefficients are dequantized and inverse transformed by the dequantizing and inverse transform unit 515 to give $D'_n$, which is identical to $D'_n$ shown in FIG. 2b. By using header information decoded from the bit stream, the decoder 400 creates a prediction macroblock $\hat{G}_n$, identical to the original prediction $\hat{G}_n$ formed in the encoder. The prediction macroblock $\hat{G}_n$, may be obtained from either Intra frame prediction (spatial prediction) performed by an Intra frame prediction unit or from motion compensation/Inter frame prediction (temporal prediction) performed by a motion compensation unit 518, which is based on one or more previously decoded reference frames $G''_{n-k}$ buffered in a frame buffer 517.

The prediction macroblock $\hat{G}_n$ is added to $D'_n$ to produce an unfiltered decoded macroblock $G'_n$ which this is filtered by the filter unit 516 to create the decoded macroblock $G''_n$. The decoded macroblock $G''_n$, may be temporarily buffered in an output buffer 520 e.g. before being supplied for reproduction.

It should be noted that in H.264/AVC the applicable prediction signal can be selected from multiple reference frames. An additional parameter is encoded with the motion vector displacement indicating the reference frame to be used. The applicable reference frames are captured in a reference frame list from which the encoder can choose. The reference frames can consist of I-, P- and B-slices. For partition sizes larger than 8×8, each partition motion vector contains a separate reference frame index. Sub-partitions of 8×8 blocks may only predict from the same reference frame. The number of applicable reference frames is determined by the sequence parameter set.

With reference to H.264/AVC, the codec specification distinguishes conceptually between a video coding layer (VCL) and a network abstraction/adaptation layer (NAL). The video coding layer (VCL) contains the signal processing functionality of the codec; mechanisms such as transform, quantization, and motion compensated prediction; and a loop filter. The video coding layer (VCL) encoder outputs slices: a bit string that contains the macroblock data of an integer number of macroblocks, and the information of the slice header (containing the spatial address of the first macroblock in the slice, the initial quantization parameter, and similar information).

Macroblocks in slices are arranged in scan order unless a different macroblock allocation is specified, by using the so-called Flexible Macroblock Ordering syntax. In-picture prediction (Intra prediction) is used only within a slice. The Network Abstraction Layer (NAL) encoder encapsulates the slice output of the video coding layer (VCL) encoder into Network Abstraction Layer Units (NAL units), which are suitable for transmission over packet networks or use in packet oriented multiplex environments. Annex B of H.264 standard defines an encapsulation process to transmit such NAL units over byte-stream oriented networks. Reference should be given thereto for detailed information.

Figure 2D:
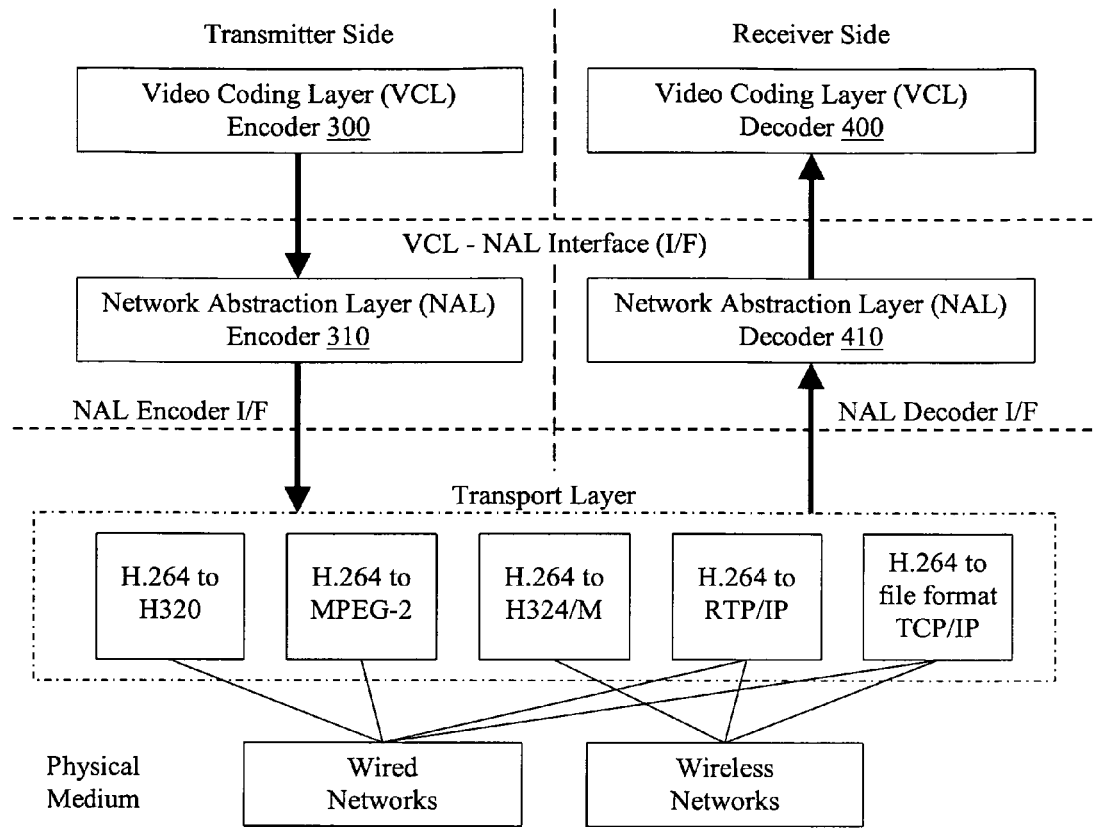
FIG. 2d shows a schematic diagram of conceptual implementation layers in accordance with H.264/AVC.

The structural two layer concept is illustrated in FIG. 2d. Reference should be given thereto. The video coding layer (VCL) is provided to allow for performing all classical signal processing tasks as described in detail above.

In general, the network adaptation layer (NAL) adapts the generated bit streams to various network and multiplexing environments. The major aspects of the layer concept is to provide a clean interface between signal processing technology of the video coding layer (VCL) and the transport-oriented mechanisms of the network adaptation layer (NAL) and source-based encoding is not necessary in heterogeneous networks. The encoded video data is organized in so-called NAL units that comprise a NAL unit header byte and an integer number of data bytes. The NAL unit header indicates the type of payload data (VCL or other). A sequence of NAL units generated by a NAL encoder 310 and in particular a payload generator 315 is referenced as a NAL unit stream.

Picture and sequence parameter set are conveyed in separate NAL units besides the VCL NAL units. Both are used to indicate settings that rarely change and hence are valid for a number of VCL NAL units. The sequence parameter set applies to a coded video sequence of successively encoded pictures. Parameters that are valid for single pictures are transmitted in the picture parameter set. Each VCL NAL unit has an identifier that indicates the picture parameter set to be used to decode the VCL data. The picture parameter set in turn contains an identifier to the applicable sequence parameter set. Both parameter sets can be transmitted at any time, e.g. well in advance before the VCL units they apply to. Since the parameter information is crucial for decoding of large portions of the NAL unit stream, it can be protected stronger or resent at any time for increased error robustness. In-band transmission with the VCL NAL units or out-of-band transmission over a separate channel can be used if desired by a target application.

Figure 2E:
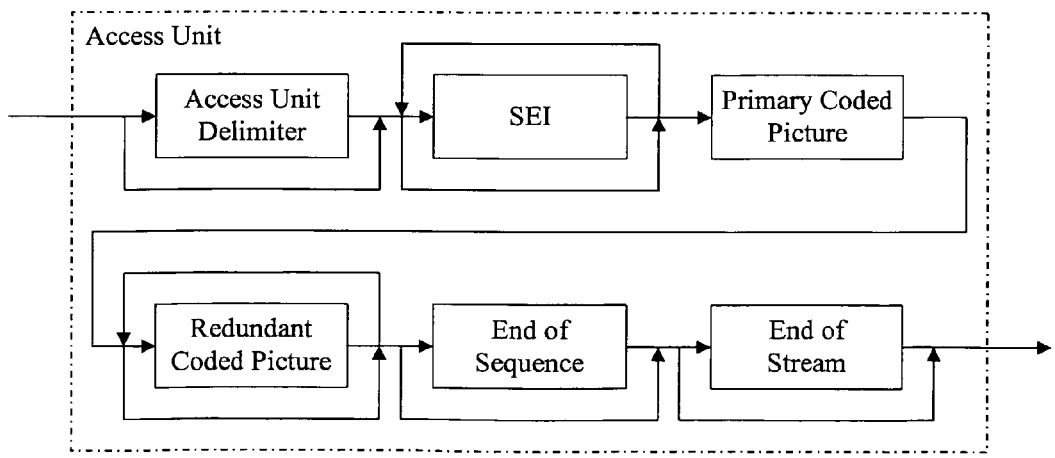
FIG. 2e shows a schematic diagram of a Access Unit according to H.264/AVC.

A set of NAL units that comprises all data necessary to decode one picture is called an Access Unit. This Access Unit comprises VCL NAL units composing the so-called Primary Coded Picture. Additionally, NAL units with supplemental enhancement information (SEI) and VCL NAL units for a redundant coded picture can be contained in an access unit. The structure of an Access Unit is exemplarily depicted in FIG. 2e.

The SEI data contains information, e.g. like timing information, is optional information to decode the current picture, but may enhance the usability of the decoded picture.

Additional VCL NAL units can be transmitted for additional representation of areas of the primary picture. These are called redundant coded pictures and can be used e.g. for error recovery. A series of sequential access units in the NAL unit stream that requires one single sequence parameter set is called a Coded Video Sequence. A NAL unit stream can contain multiple Coded Video Sequences. Each Coded Video Sequence begins with an Access Unit containing an instantaneous decoding refresh (IDR) picture. The IDR picture consists of a self-contained intra coded picture that is required to start a new video sequence. The pictures of an encoded video sequence are partitioned into macroblocks. A macroblock (MB) is the basic building block of the standard the decoding process is specified for. A macroblock comprises typically 16×16 pixels of luma and the two corresponding chroma 8×8 blocks. The macroblocks (MBs) in a picture are organized in slices. A slice is a sequence of successive macroblocks within a slice group (see below) that is self-contained. A set of one or more slices comprises a picture. Here, self-contained means that the slice can be decoded independently from other slices in the same picture according to the applicable sequence and picture parameter sets. Thereby, parallel decoding of multiple slices in a picture is enabled. A functionality of Arbitrary Slice Ordering (ASO) enables the encoder to send the slices of a frame in any order relative to each other. Slice groups are introduced with the concept of Flexible Macroblock Ordering (FMO). With Flexible Macroblock Ordering, the macroblocks in a picture are assigned to a slice group according to a Macroblock-to-Slice-Group map (MB2SG). A slice group can contain multiple slices that in turn contain a sequence of macroblocks that belong to the slice group according to the MB2SG map. In contrast to conventional slices, Flexible Macroblock Ordering (FMO) allows for almost arbitrary arrangements of macroblocks belonging to a slice group.

Additionally, a group of pictures (GOP) concept is inherited from typical video codecs including MPEG x and H.26x standard and refers to an I-frame, followed by all the P and B-frames to a next I-frame exclusive. For instance, a typical MPEG GOP structure might be IBBPBBPBB.

Real-time Transport Protocol (RTP) as specified in RFC 3550 is one of the major transport protocols applicable for transmission over any wireless or wired communication media including in particular the aforementioned data communications and broadcasting networks. The Real-time Transport Protocol (RTP) payload format provides end-to-end network transport functions suitable for applications transmitting real-time data, such as audio and video, over multicast or unicast network services. An RTP payload format specifies the mapping between a particular coding format and RTP packets, i.e. the payload format specifies the structure of the RTP payload for a particular coding format.

The RTP payload format for H.264 video, RFC 3984, allows for packetization of one or more Network Abstraction Layer (NAL) Units in each Real-time Transport Protocol (RTP) payload. The payload format has wide applicability, as it supports applications from simple low bit-rate conversational usage, to Internet video streaming with interleaved transmission, to high bit rate video-on-demand.

Different packetization modes are supported by the RTP payload format for H.264 video: Single NAL unit mode, Non-interleaved mode, and Interleaved mode.

The single NAL unit mode is targeted for conversational systems that comply with ITU-T Recommendation H.241. The non-interleaved mode is targeted for conversational systems that may not comply with ITU-T Recommendation H.241. In the non-interleaved mode, which is specifically addressed by the concept of the present invention, NAL units are transmitted in NAL unit decoding order. The interleaved mode is targeted for systems that do not require very low end-to-end latency. The interleaved mode allows transmission of NAL units out of NAL unit decoding order. The transmission order of NAL units is allowed to differ from the decoding order of the NAL units. A decoding order number (DON) is a field in the payload structure or a derived variable that indicates the NAL unit decoding order.

In general, the decoding order number (DON) is a field in the payload structure, or a derived variable indicating NAL unit decoding order. Values of decoding order number (DON) are in the range of 0 to 65535, inclusive. After reaching the maximum value, the value of DON wraps around to 0.

Moreover, with reference to page 17 of RFC 3984 it is stated that

"Values of DON related fields MUST be such that the decoding order determined by the values of DON, as specified above, conforms to the NAL unit decoding order. If the order of two NAL units in NAL unit decoding order is switched and the new order does not conform to the NAL unit decoding order, the NAL units MUST NOT have the same value of DON. If the order of two consecutive NAL units in the NAL unit stream is switched and the new order still conforms to the NAL unit decoding order, the NAL units MAY have the same value of DON. For example, when arbitrary slice order is allowed by the video coding profile in use, all the coded slice NAL units of a coded picture are allowed to have the same value of DON. Consequently, NAL units having the same value of DON can be decoded in any order, and two NAL units having a different value of DON should be passed to the decoder in the order specified above. When two consecutive NAL units in the NAL unit decoding order have a different value of DON, the value of DON for the second NAL unit in decoding order SHOULD be the value of DON for the first, incremented by one."

A typical problem in digital video transmission is under-utilization of available bit rate when transmitter-side buffering is low. The compression ration of video depends on the source material—complicated textures, fast motion, big moving areas, or non-translational motion make pictures more difficult to compress. Many times video streams contain sections of different "complexity" for compression efficiency, and when the picture quality is kept constant, the resulting bit rate varies. Especially in case of live encoding (i.e. real-time encoding and relatively small buffer between the encoder and the transmitter) the transmitted bit rate also varies as a function of source content. This may lead to an unnecessary and undesired under-utilization of the available channel bit rate.

In view of the aforementioned under-utilization, an increase in initial buffering delay may appear. Many times a coded video stream is a concatenation of coded sequences from different origin. For example, consider the following application case: A football game is broadcast live in a packet-based network including packet data networks and/or broadcasting networks. The business model of the content provider is based on insertion of commercials into the ongoing program broadcast. The exact time for this insertion, however, is not known precisely, as the broadcaster will not want to interrupt an ongoing game and wait for a break.

Since there is a complete scene change between the football game and the commercial, there is normally a need for an I picture or an IDR picture at the beginning of the video picture sequence coding the commercial. Transmitting this first picture in high quality normally requires a significantly higher number of bits, which may add initial buffering delay and buffer space requirements, because it is not previously known exactly where this I picture is added or decoded. The first picture of the commercial may follow an I picture that was just transmitted as part of the usual broadcast program. Consequently, the required initial buffering time for the intra picture may be relatively high, which may cause a temporary picture freeze before showing the first picture of the commercial. However, the time delay for inserting commercials to typically limited and each delay in time may be annoying to the viewers.

Consequently an enhanced time controlling of the reproduction is required. A first approach may use explicit commands to control when a picture is to be reproduced. For example, in JVT-D093 "On NAL Unit Order" (Joint Video Team of ISO/IEC MPEG & ITU-T VCEG, $4^{th}$ Meeting in Klagenfurt, Austria, 22-26 Jul. 2002) it is claimed that "Picture Freeze Request" and "Picture Freeze Release" Supplemental Enhancement Information (SEI) messages can be used to prevent the displaying of a picture sent "early" and in JVT-C141 "ERPS Use for Commercials in Broadcasting/Streaming" (Joint Video Team of ISO/IEC MPEG & ITU-T VCEG), $3^{rd}$ Meeting in Fairfax, Va., USA, 6-10 Mai 2002 it is proposed that the "Display Command" Supplemental Enhancement Information (SEI) message could be used to control the displaying moment an "early-transmitted" picture.

However, the Real-time Transport Protocol (RTP) based systems do not count on Supplemental Enhancement Information (SEI) messages when picture display timing has to be resolved.

With reference to RFC 3984 page 10, it is stated that

"Receivers SHOULD ignore any picture timing SEI messages included in access units that have only one display timestamp. Instead, receivers SHOULD use the RTP timestamp for synchronizing the display process.

RTP senders SHOULD NOT transmit picture timing SEI messages for pictures that are not supposed to be displayed as multiple fields."

Therefore, it would be inconsequent to require handling of some SEI messages for picture display timing, while the picture timing Supplemental Enhancement Information (SEI) message is discouraged. The "Display Command" Supplemental Enhancement Information (SEI) message has not become part of the standard.

Moreover, with reference to RFC 3984 page 17, it is described that

"Receivers should not expect that the absolute difference of values of DON for two consecutive NAL units in the NAL unit decoding order will be equal to one, even in error-free transmission. An increment by one is not required, as at the time of associating values of DON to NAL units; it may not be known whether all NAL units are delivered to the receiver. For example, a gateway may not forward coded slice NAL units of non-reference pictures or SEI NAL units when there is a shortage of bit rate in the network to which the packets are forwarded. In another example, a live broadcast is interrupted by pre-encoded content, such as commercials, from time to time. The first intra picture of a pre-encoded clip is transmitted in advance to ensure that it is readily available in the receiver. When transmitting the first intra picture, the originator does not exactly know how many NAL units will be encoded before the first intra picture of the pre-encoded clip follows in decoding order. Thus, the values of DON for the NAL units of the first intra picture of the pre-encoded clip have to be estimated when they are transmitted, and gaps in values of DON may occur."

The basic concept of the present invention provides for a statistical multiplexing of at least two video sequences (a first and a second video sequence each comprising one or more NAL units) composing a single video stream. Herein statistical multiplexing means, that at least some NAL units (which will be called herein in-advance transmitted NAL units) of a second sequence are transmitted interleaved with the first video sequence. It should be noted that the second sequence designates the second sequence in decoding or reproduction (display) order. It should be further understood that the second sequence is preferably decoded and reproduced immediately in time after the first sequence. The interleaved transmission should use the interleaved packetization mode of the RTP payload format for H.264/AVC as defined in RFC 3984.

The decoding/reproduction point in time of the decoded pictures corresponding to the in-advance transmitted NAL units (of the second sequence) is not known at the time of transmission.

Figure 3A:
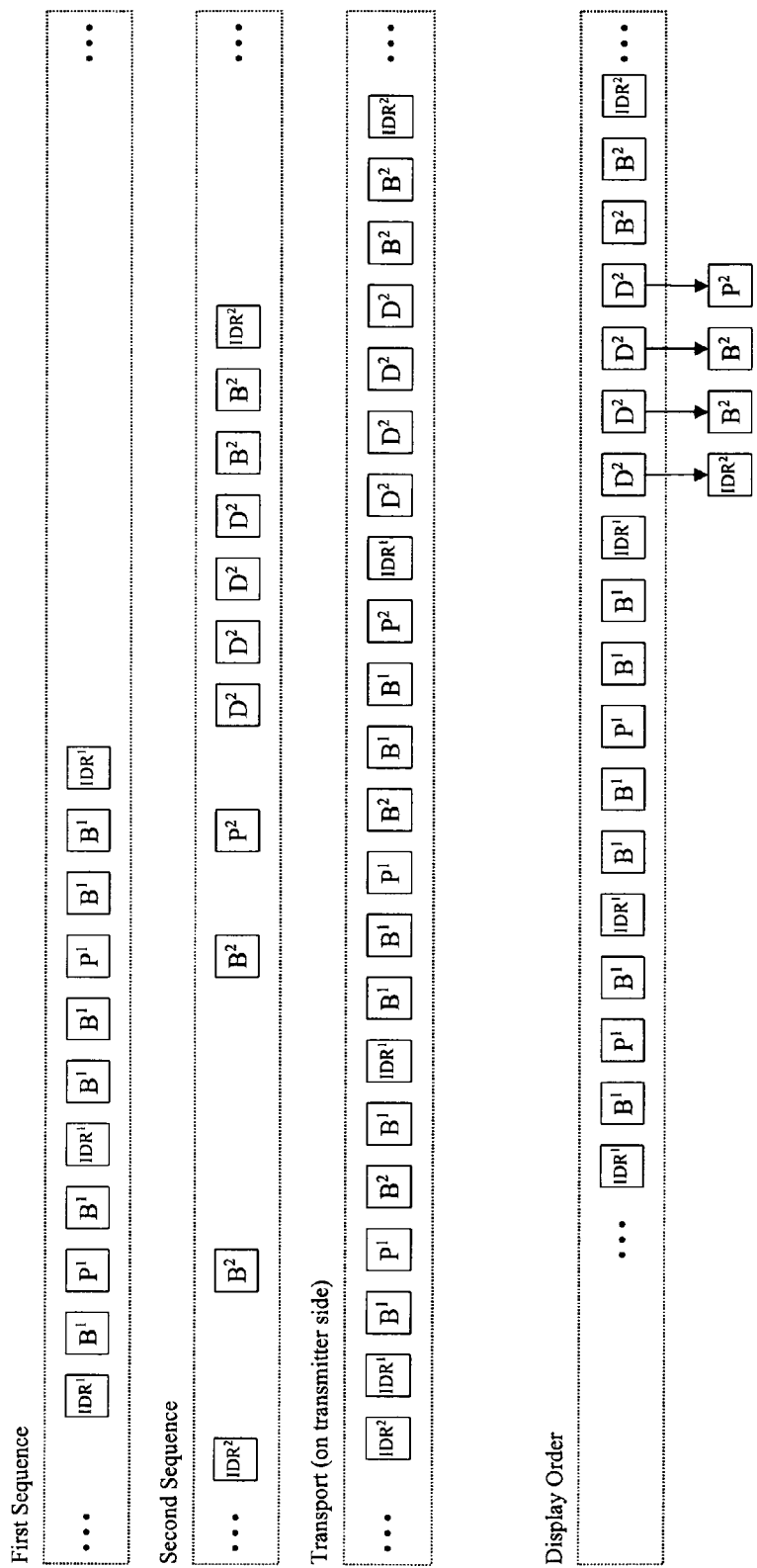
FIG. 3a shows a schematic time diagram illustrating different digital video sequences and reproduction order thereof.

Reference should be given to FIG. 3a, which depicts schematic diagrams illustrating the video sequences, a statistically multiplexed sequence on transport level and a display sequence in accordance with an embodiment of the present invention. In addition, reference should also be given to FIG. 3b, which depicts schematically components on Network Adaptation Layer (NAL) level, applicable for realizing the inventive concept according to an embodiment of the invention.

As aforementioned, a first and second sequence of VCL NAL units is depicted. For the sake of illustration, the first VCL NAL sequence comprises exemplarily a first sub-sequence of pictures $IDR^1, B^1, P^1, B^1$ (which is herein exemplarily a first group of pictures (GOP)) and a second sub-sequence of pictures $IDR^1, B^1, B^1, P^1, B^1, B^1$ (which is herein exemplarily a second group of pictures (GOP)). Those skilled in the art will appreciate that the picture/frame sequence of the first sequence is just illustratively, the present invention should be understood as not limited thereto. The second VCL NAL sequence comprises exemplarily a first sub-sequence including $IDR^2, B^2, B^2, P^2$, and a second sub-sequence comprising $D^2, D^2, D^2, D^2, B^2, B^2, IDR^2$. Those skilled in the art will appreciate that the picture/frame sequence of the second sequence is just illustratively, the present invention should be understood as not limited thereto. It should be understood that IDR refers to an Instantaneous Decoder Refresh (IDR) Intra-frame (I-frame) coded picture, P refers to a P-frame coded picture, and B refers to a B-frame coded picture as defined above. D refers to dummy timing pictures, which are described below.

Figure 3B:
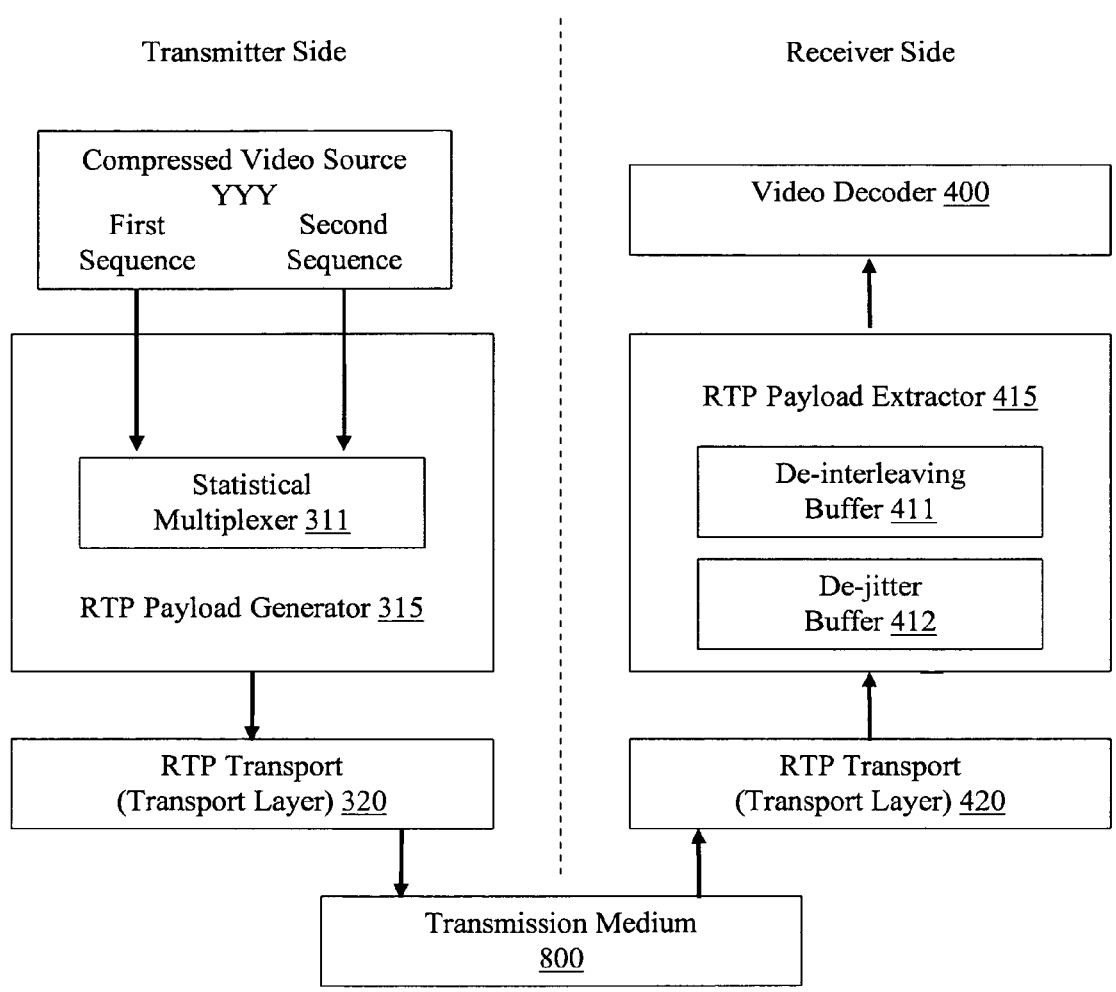
FIG. 3b shows a schematic component layer diagram according to an embodiment of the present invention.

In order to illustrate the statistic multiplexing performed by interleaving, the statistically multiplexed sequence on transport level, where the first sub-sequence of the second sequence of VCL NAL units is interleaved with the first sequence of VCL NAL units. The first sub-sequence of the second sequence corresponds to the aforementioned generally designated in-advance transmitted NAL units. According to an embodiment of the present invention, on transmitter side, a statistical multiplexer unit 311 performs the statistical multiplexing in dependence the bit rate required for transmission of the first sequence of VCL NAL units. This means that the in-advance transmitted NAL units (the first sub-sequence of the second sequence) is interleaved with the first sequence in case the required bit rate for transmission of the NAL units of the first sequence is below a pre-defined threshold. Once falling below this threshold is detected, interleaving is performed in order to effectively utilize the total available bit rate. The forming of the data packet payload is operable under control of the payload generator 315, which is herein illustratively part of the NAL encoder 310 described above. The forming of the payload is performed in accordance with the multiplexed sequence resulting from the statistical multiplexer 311. Without limiting thereto, the first and second digital video sequences are provided by a source 705 for compressed/digital video sequences. It should be noted that although the interleaving is illustrated in FIG. 3b on the basis of pictures, slices of pictures may be transmitted in interleaved manner. In particular in view of I-frame coded pictures or IDR coded pictures, a comparably huge amount of data has to be transmitted. The partitioning of such I-frame/IDR coded pictures into slices requiring correspondingly smaller transmission promotes the advantageous utilization of the available total bit rate of the transmission medium.

With reference to the application case, those skilled in the art will appreciate that at the time the commercial starts an Intra-coded picture is available. According to an embodiment of the invention, slices of first Intra-coded picture are transmittable beforehand, probably over the course of many seconds. Every time the real-time encoder and/or the statistical multiplexer unit sense available bits due to low scene activity, respectively, another slice of the Intra-coded picture could be sent.

In accordance with the concept of the present invention, the transmitter sets the RTP timestamp of the in-advance transmitted NAL units to a value that is (considerable) lower than for the previously decoded picture in output order. Thus, the receiver will not decode and reproduce the picture(s) corresponding to the in-advance transmitted NAL units. However, the in-advance transmitted NAL units are stored on receiver side.

In interleaved mode, the general concept behind de-packetization on receiver side is to reorder NAL units from transmission order to the NAL unit decoding order. The receiver, herein the NAL decoder 410 and in particular the payload extractor 415, includes a receiver buffer, which is used to compensate for transmission delay jitter and to reorder packets from transmission order to the NAL unit decoding order. In view of interleaved mode, the receiver operation should be outlined under the assumption that there is no transmission delay jitter. To make a difference from a practical receiver buffer that is also used for compensation of transmission delay jitter, the receiver buffer should be here after called the deinterleaving buffer. Nevertheless, it should be understood that a receiver or the NAL decoder and the payload extractor should also prepare for transmission delay jitter; i.e., either reserve a separate buffer for transmission delay jitter buffering and deinterleaving buffering or use a general buffer for both transmission delay jitter and deinterleaving. Moreover, a receiver has generally to take transmission delay jitter into account in the buffering operation; e.g., by additional initial buffering before starting of decoding and displaying/reproducing.

The deinterleaving buffer may be operated in two buffering states, i.e. an initial buffering and buffering while displaying/reproducing. The initial buffering occurs when a Real-time Transport Protocol (RTP) session is initialized. After initial buffering, decoding and displaying/reproducing is started, and the buffering-while-playing mode is used. Regardless of the buffering state, the receiver stores incoming NAL units, in reception order, in the deinterleaving buffer as follows.

NAL units of aggregation packets are stored in the deinterleaving buffer individually. The value of decoding order number (DON) is calculated and stored for all NAL units. Inter alia, the initial buffering state is operable until there are N VCL NAL units in the deinterleaving buffer or for the duration equal to or greater than a predefined threshold (sprop-init-buf-time MIME parameter). In order to supply NAL units for decoding, the NAL units to be removed from the deinterleaving buffer in case the deinterleaving buffer contains at least a predetermined number N of VCL NAL units. Then, the NAL units are removed from the deinterleaving buffer and passed to the decoder in the order specified in accordance with the DON until the buffer contains a number of N−1 VCL NAL units.

The order in which NAL units are passed to the decoder is specified on the basis of the DON and in particular on the basis of a DON distance algorithm determined in dependence on the DON assigned to each VCL NAL unit. For detailed information about the DON distance algorithm reference should be given to RFC 3984.

When the display time of the pictures corresponding to the in-advance transmitted NAL units becomes available, the transmitter generates coded picture(s), herein called dummy timing pictures, which are preferably inter-predicted from the decoded picture(s) corresponding to the in-advance transmitted NAL units without any prediction error data. In other words, decoding of the dummy timing pictures results into exact copies of the decoded pictures corresponding to the in-advance-transmitted NAL units. With reference to FIG. 3b, the dummy timing pictures are referred to as $D^2$.

The decoded reference picture marking syntax element in the dummy timing pictures should be set such that no copies of decoded pictures exist in the reference picture buffer. The RTP timestamp for the dummy timing pictures is set according to the desired reproduction/display time. Consequently, receivers will reproduce/display the pictures at their correct timestamps, which is exemplarily illustrated in FIG. 3b, where the display order of the first and second sequence in accordance with the inventive concept is shown.

Those skilled in the art will appreciate on the basis of the embodiments described above that the inventive concept is not limited to the aforementioned application case. The concept of the present invention is operable with current standard-compliant implementations. It should be noted that no additional signaling in regard of compared to the currently specified standards is needed. The scope of the present invention is only limited by the accompanying claims.

What is claimed is:

1. Method of statistical interleaving of at least two digital video sequences each comprising a plurality of coded pictures to be reproduced by a decoder, wherein the two digital video sequences form one video stream, the method comprising:
   statistical multiplexing a first digital video sequence with a second digital video sequence, wherein the pictures of the second digital video sequence are included in advance in the video stream and are associated with timing information such that a receiver will not decode and reproduce the pictures of the second digital video sequence;
   composing the at least two digital video sequences into the video stream in an interleaved manner in correspondence with a result of the statistical multiplexing; and
   subsequently including a sequence of dummy timing pictures into the video stream, which the dummy timing pictures are inter-predicted from one or more pictures of the second video sequence coded in advance in said video stream, wherein the dummy timing pictures are coded by omitting any prediction error data;
   whereby decoding the dummy timing pictures results in copies of decoded pictures corresponding to the one or more pictures of the second sequence included in the video stream in advance.

2. Method according to claim 1, wherein the pictures of the first video sequence and the dummy timing picture sequence are intended for real-time reproduction.

3. Method according to claim 1, wherein the pictures of the digital video sequences comprises one or more slices, which can be rearranged to pictures.

4. Method according to claim 1, wherein the statistical multiplexing is performed in dependence of an available bit rate provided by a transport medium indented for transmission of the video stream and/or in dependence on a target bit rate required for transmission of the first digital video sequence.

5. Method according to claim 1, wherein the statistical multiplexing is performed in dependence of a bit rate threshold.

6. Method according to claim 1, wherein each picture of the second digital video sequence, which is included in the video stream in advance, is associated with timestamp information, which refers to earlier time information than the time information of pictures of the first video sequence included in the video stream next to the pictures of the second digital video sequences.

7. Computer program product for statistical interleaving of at least two digital video sequences each comprising a plurality of coded pictures to be reproduced by a decoder, wherein the two digital video sequences form one video stream, which computer program product comprises program code sections stored on a non-transitory machine-readable medium for carrying out the operations of the program code section when executed on a processor-based device, a terminal device, a network device, a portable terminal, a consumer electronic device, or a wireless communication enabled terminal, the operations comprising:
   statistical multiplexing a first digital video sequence with a second digital video sequence, wherein the pictures of the second digital video sequence are included in advance in the video stream and are associated with timing information such that a receiver will not decode and reproduce the pictures of the second digital video sequence;
   composing the at least two digital video sequences into the video stream in an interleaved manner in correspondence with a result of the statistical multiplexing; and
   subsequently including a sequence of dummy timing pictures into the video stream, which dummy timing pictures are inter-predicted from one or more pictures of the second video sequence coded in advance in said video stream, wherein the dummy timing pictures are coded by omitting any prediction error data;
   whereby decoding the dummy timing pictures results in copies of decoded pictures corresponding to the one or more pictures of the second sequence included in the video stream in advance.

8. Module for statistical interleaving of at least two digital video sequences each comprising a plurality of coded pictures to be reproduced by a decoder, wherein the two digital video sequences form one video stream,
   the module comprising:
   a statistical multiplexer which is configured to statistically multiplex a first digital video sequence with a second digital video sequence, wherein the pictures of the second digital video sequence are included in advance in the video stream and are associated with timing information such that a receiver will not decode and reproduce the pictures of the second digital video sequence;
   a payload generator which is arranged for composing the at least two digital video sequences into the video stream in an interleaved manner in correspondence with a result of the statistical multiplexing; and a network layer encoder is arranged for subsequently including a sequence of dummy timing pictures into the video stream, which dummy timing pictures are inter-predicted from one or more pictures of the second video sequence coded in advance in the video stream, wherein the dummy timing pictures are coded by omitting any prediction error data;

whereby decoding the dummy timing pictures results in copies of decoded pictures corresponding to the one or more pictures of the second sequence included in the video stream in advance.

9. Module according to claim 8, wherein the statistical multiplexer is operable with an available bit rate provided by a transport medium intended for transmission of the video stream and/or in dependence on a target bit rate required for transmission of the first digital video sequence.

10. Module according to claim 8, wherein the statistical multiplexer is operable in dependence of a bit rate threshold.

11. Module according to claim 8, wherein each picture of the second digital video sequence, which is included in the video stream in advance, is associated with timestamp information, which refers to earlier time information than the time information of pictures of the first video sequence included in the video stream next to the pictures of the second digital video sequences.

12. Device for statistical interleaving of digital video sequences, the device comprising:
at least two digital video sequences each comprising a plurality of coded pictures to be reproduced by a decoder, wherein the two digital video sequences form one video stream;
a statistical multiplexer which is configured to statistically multiplex a first digital video sequence with a second digital video sequence, wherein the pictures of the second digital video sequence are included in advance in the video stream and are associated with timing information such that a receiver will not decode and reproduce the pictures of the second digital video sequence;
a payload generator which is arranged for composing the at least two digital video sequences into the video stream in an interleaved manner in correspondence with a result of the statistical multiplexing; and
a network layer encoder is arranged for subsequently including a sequence of dummy timing pictures into the video stream, which dummy timing pictures are inter-predicted from one or more pictures of the second video sequence coded in advance in the video stream, wherein the dummy timing pictures are coded by omitting any prediction error data;
whereby decoding the dummy timing pictures results in copies of decoded pictures corresponding to the one or more pictures of the second sequence included in the video stream in advance.

13. Device according to claim 12, wherein the statistical multiplexer is operable with an available bit rate provided by a transport medium intended for transmission of the video stream and/or in dependence on a target bit rate required for transmission of the first digital video sequence.

14. Device according to claim 12, wherein the statistical multiplexer is operable in dependence of a bit rate threshold.

15. Device according to claim 12, wherein each picture of the second digital video sequence, which is included in the video stream in advance, is associated with timestamp information, which refers to earlier time information than the time information of pictures of the first video sequence included in the video stream next to the pictures of the second digital video sequences.

16. Device according to claim 12, wherein the video stream is intended for transmission through a packet-based communications network and/or a packet based broadcasting network.

17. System for statistical interleaving of digital video sequences,
the system comprising:
at least two digital video sequences each comprising a plurality of coded pictures to be reproduced by a decoder, wherein the two digital video sequences form one video stream;
a statistical multiplexer which is configured to statistically multiplex a first digital video sequence with a second digital video sequence, wherein the pictures of the second digital video sequence are included in advance in the video stream and are associated with timing information such that a receiver will not decode and reproduce the pictures of the second digital video sequence;
a payload generator which is arranged for composing the at least two digital video sequences into the video stream in an interleaved manner in correspondence with a result of the statistical multiplexing; and
a network layer encoder is arranged for subsequently including a sequence of dummy timing pictures into the video stream, which dummy timing pictures are inter-predicted from to refer to one or more pictures of the second video sequence coded in advance in the video stream, wherein the dummy timing pictures are coded by omitting any prediction error data;
whereby decoding the dummy timing pictures results in copies of decoded pictures corresponding to the one or more pictures of the second sequence included in the video stream in advance.

18. System according to claim 17, wherein the statistical multiplexer is operable with an available bit rate provided by a transport medium intended for transmission of the video stream and/or in dependence on a target bit rate required for transmission of the first digital video sequence.

19. System according to claim 17, wherein the statistical multiplexer is operable in dependence of a bit rate threshold.

20. System according to claim 17, wherein each picture of the second digital video sequence, which is included in the video stream in advance, is associated with timestamp information, which refers to earlier time information than the time information of pictures of the first video sequence included in the video stream next to the pictures of the second digital video sequences.

21. System according to claim 17, comprising a receiving device including a video decoder arranged for reproducing the video stream, a network layer decoder arranged for receiving the transmitted digital video sequences and supplying the pictures of the digital video sequences in display order to the video decoder for reproducing the video stream.

* * * * *

UNITED STATES PATENT AND TRADEMARK OFFICE
CERTIFICATE OF CORRECTION

| | |
|---|---|
| PATENT NO. | : 8,582,663 B2 |
| APPLICATION NO. | : 11/500802 |
| DATED | : November 12, 2013 |
| INVENTOR(S) | : Hannuksela |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1951 days.

Signed and Sealed this
Seventh Day of April, 2015

Michelle K. Lee
*Director of the United States Patent and Trademark Office*